United States Patent
Lad et al.

(10) Patent No.: US 11,455,839 B2
(45) Date of Patent: Sep. 27, 2022

(54) NETWORK CONNECTION OUTAGE PREDICTION DUE TO ANTENNA FAILURE USING MACHINE LEARNING

(71) Applicant: Panasonic Avionics Corporation, Lake Forest, CA (US)

(72) Inventors: Samir Lad, Dublin, CA (US); Hanbin Liu, Orinda, CA (US); Alan Campbell, Trabuco Canyon, CA (US); Dennis Rilea, Foothill Ranch, CA (US); Paul Sarraffe, Lake Forest, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 134 days.

(21) Appl. No.: 17/133,082

(22) Filed: Dec. 23, 2020

(65) Prior Publication Data

US 2022/0101657 A1    Mar. 31, 2022

Related U.S. Application Data

(63) Continuation-in-part of application No. 17/039,712, filed on Sep. 30, 2020.

(51) Int. Cl.
| | |
|---|---|
| G07C 5/00 | (2006.01) |
| H04B 17/373 | (2015.01) |
| G07C 5/12 | (2006.01) |
| H04B 17/382 | (2015.01) |
| H04W 72/08 | (2009.01) |
| H04W 24/06 | (2009.01) |
| H04B 7/185 | (2006.01) |
| H04B 17/391 | (2015.01) |

(52) U.S. Cl.
CPC ............. *G07C 5/006* (2013.01); *G07C 5/008* (2013.01); *G07C 5/12* (2013.01); *H04B 7/18519* (2013.01); *H04B 17/373* (2015.01); *H04B 17/382* (2015.01); *H04B 17/3911* (2015.01); *H04W 24/06* (2013.01); *H04W 72/085* (2013.01)

(58) Field of Classification Search
CPC .......... G07C 5/006; G07C 5/008; G07C 5/12; H04B 7/18519; H04B 17/373; H04B 17/382; H04B 17/3911; H04B 17/17; H04B 17/3913; H04W 24/06; H04W 72/085; H04W 4/24; H04M 15/8351; H04M 15/853
See application file for complete search history.

(56) References Cited

U.S. PATENT DOCUMENTS

| | | | | |
|---|---|---|---|---|
| 2003/0233658 | A1* | 12/2003 | Keen | H04N 7/106 348/E7.071 |
| 2021/0075871 | A1* | 3/2021 | Mohr | H04W 4/021 |
| 2022/0104167 | A1* | 3/2022 | Campbell | H04W 4/24 |

\* cited by examiner

*Primary Examiner* — Tejis Daya
(74) *Attorney, Agent, or Firm* — Perkins Coie LLP

(57) ABSTRACT

A system for predicting an outage for a commercial passenger vehicle is described. The system includes a storage configured to store flight information of the commercial passenger vehicle that includes an antenna configured to assist a network connectivity for devices in the commercial passenger vehicle to remote devices, the flight information including travel information of the commercial passenger vehicle and antenna-related information of the antenna; and a server configured to apply a machine learning algorithm that (1) processes the flight information and (2) generate an output indicative of a probability of an antenna-related outage of the network connectivity that is caused due to a failure of the antenna based on processed flight information.

20 Claims, 17 Drawing Sheets

Predicted Failing Antennas

| Tail | Operator | Antenna - SN | Score |
|---|---|---|---|
| Tail 1 | Operator A | LS1309 | 5 |
| Tail 2 | Operator B | LS1070 | 5 |
| Tail 3 | Operator C | LS1050 | 5 |
| Tail 4 | Operator D | LS1211 | 5 |
| Tail 5 | Operator E | LS3141 | 5 |
| Tail 6 | Operator F | LS1232 | 5 |
| Tail 7 | Operator G | LS8706 | 4 |
| Tail 8 | Operator H | LS1669 | 3 |

*FIG. 15A*

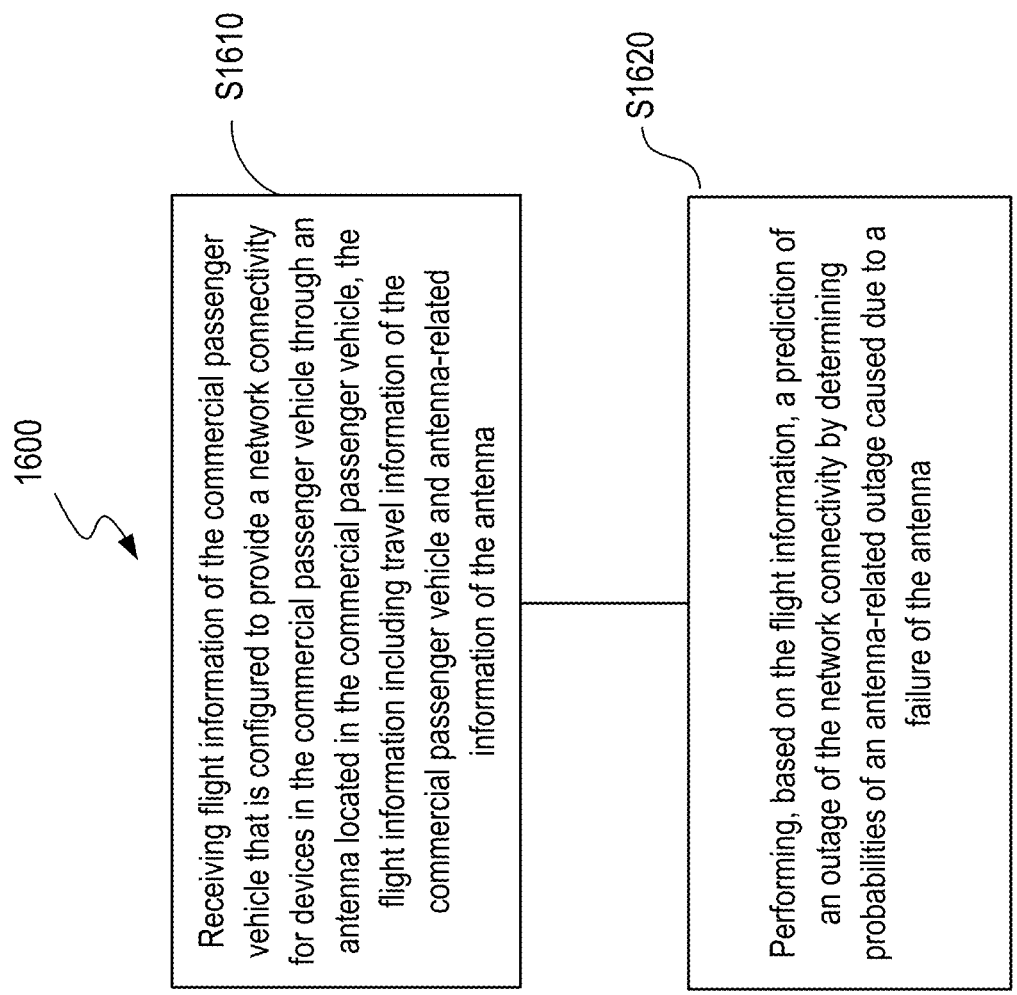

NETWORK CONNECTION OUTAGE PREDICTION DUE TO ANTENNA FAILURE USING MACHINE LEARNING

CROSS REFERENCE TO RELATED APPLICATIONS

This application is a continuation-in-part of U.S. patent application Ser. No. 17/039,712, filed on Sep. 30, 2020. The aforementioned patent application is hereby incorporated by reference in its entirety.

TECHNICAL FIELD

This document relates to network outage prediction schemes for a commercial passenger vehicle such as an airplane, a passenger train, a commercial bus, a cruise ship, and others.

BACKGROUND

Many commercial airplanes have individualized video and audio entertainment systems, often referred to as "inflight entertainment" or "IFE" systems. Such systems may also be referred to as "inflight entertainment and communication" systems as well, and typically abbreviated as "IFEC" systems. The IFEC systems typically use an antenna system to interface with a satellite for sending and receiving content. Interruptions of services in using the IFEC system can been caused due to outages that affect communication resources available for the commercial passenger vehicle.

SUMMARY

Various implementations of the disclosed technology relate to outage prediction schemes for a commercial passenger vehicle. Some embodiments of the disclosed prediction schemes allow to predict a network service outage that can happen on a commercial passenger vehicle and avoid and/or prepare for a service outage, thereby improving passenger experience during a travel.

In one representative aspect, a system for predicting an outage for a commercial passenger vehicle is described. The system includes a storage configured to store travel information of an upcoming travel by the commercial passenger vehicle that is configured to provide a network connectivity for devices in the commercial passenger vehicle to remote devices; and a server configured to process the travel information and generate an output indicative of a probability of an outage of the network connectivity based on the travel information of the upcoming travel, and wherein the server is further configured to apply a machine learning algorithm that (1) processes the travel information based on history information related to a planned route to be taken during the upcoming travel and regulation information related to the upcoming travel and (2) determines the probability of the outage along the planned route.

In another representative aspect, a method for predicting an outage for a commercial passenger vehicle is described. The method includes receiving travel information of an upcoming travel of the commercial passenger vehicle that is configured to provide a network connectivity for devices in the commercial passenger vehicle; and performing, based on the travel information, a prediction of an outage of the network connectivity by determining probabilities of any of a weather-related outage caused due to a weather condition during the upcoming travel, a polar outage caused near a polar area, or a tail-blockage caused of a certain position of a tail of the commercial passenger vehicle relative to a satellite.

In another representative aspect, an apparatus for providing an outage prediction for a passenger on a commercial passenger vehicle is described. The apparatus is located in the commercial passenger vehicle and comprises: an onboard server in communication with a ground server and configured to (1) receive, from the ground server, outage prediction information about a probability of an outage that is predicted to occur along a route of a travel and affects a network connectivity for devices in the commercial passenger vehicle to remote devices outside of the commercial passenger vehicle and (2) provide the outage prediction information to the passenger in the commercial passenger vehicle; and a personal electronic device in communication with the onboard server and configured to receive the outage prediction information from the onboard server.

In another representative aspect, a system for predicting an outage for a commercial passenger vehicle is described. The system includes a storage configured to store flight information of the commercial passenger vehicle that includes an antenna configured to assist a network connectivity for devices in the commercial passenger vehicle to remote devices, the flight information including travel information of the commercial passenger vehicle and antenna-related information of the antenna; and a server configured to apply a machine learning algorithm that (1) processes the flight information and (2) generate an output indicative of a probability of an antenna-related outage of the network connectivity that is caused due to a failure of the antenna based on processed flight information.

In another representative aspect, a method for predicting an outage for a commercial passenger vehicle is described. The method includes receiving flight information of the commercial passenger vehicle that is configured to provide a network connectivity for devices in the commercial passenger vehicle through an antenna located in the commercial passenger vehicle, the flight information including travel information of the commercial passenger vehicle and antenna-related information of the antenna; and performing, based on the flight information, a prediction of an outage of the network connectivity by determining probabilities of an antenna-related outage caused due to a failure of the antenna.

The above and other aspects and their implementations are described in greater detail in the drawings, the descriptions, and the claims.

BRIEF DESCRIPTION OF THE DRAWINGS

FIG. 16 shows a flowchart of an example method of predicting an outage due to an antenna failure for a commercial passenger vehicle based on some implementations of the disclosed technology.

DETAILED DESCRIPTION

Figure 1:
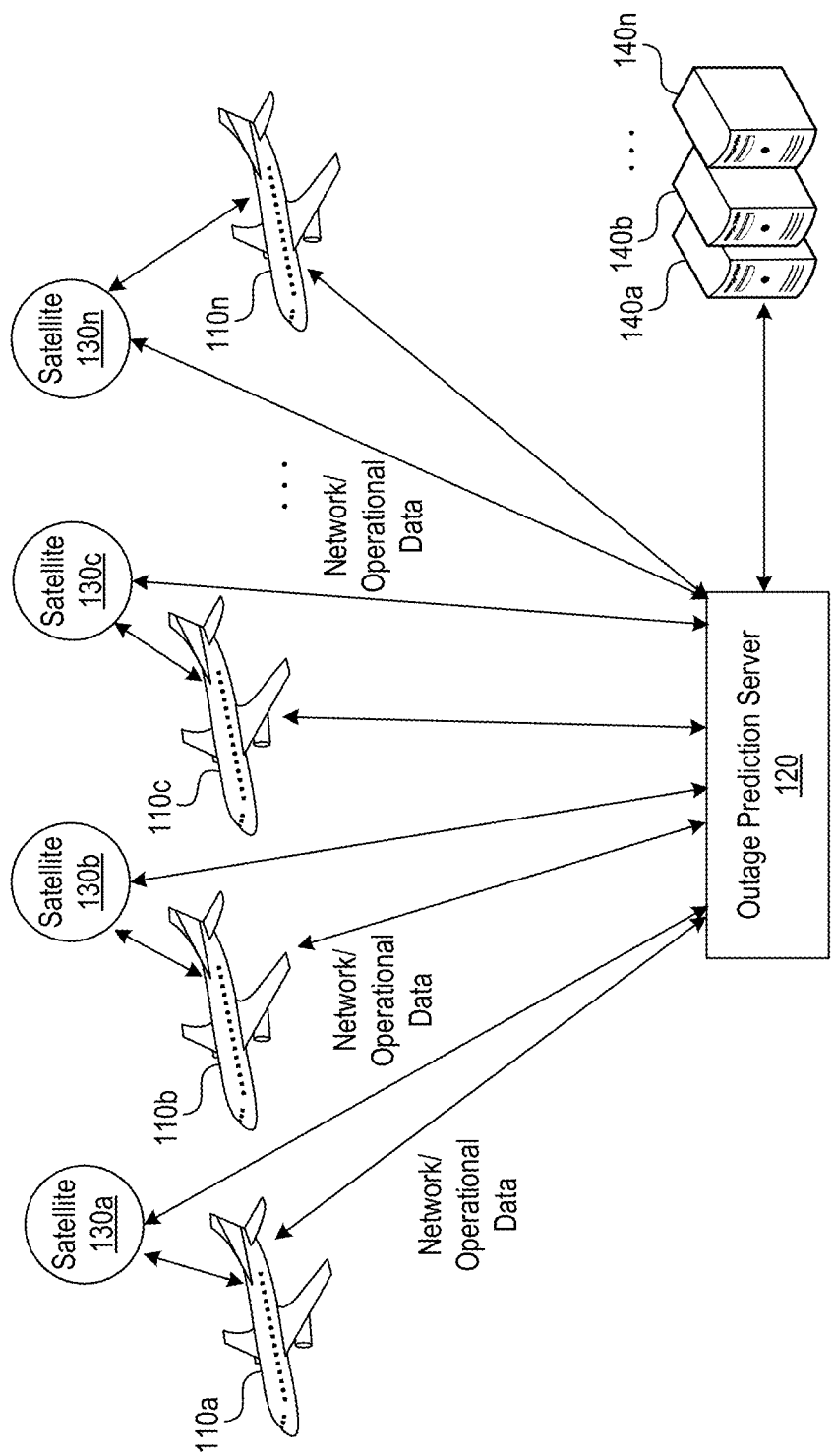
FIG. 1 shows an example of a configuration of an outage prediction system based on some implementations of the disclosed technology.

In recent years, portable user devices such as tablets, mobile phones and laptops that offer wired or wireless connectivity have proliferated. Passengers on commercial vehicles such as an airplane, a train or a bus have begun using their portable devices for entertainment and productivity and look for data connectivity during their travel. As a result, new technologies have been developed that offer network connectivity to passenger devices during travel.

Due to mobility of commercial passenger vehicles, however, several technical challenges exist for offering network connectivity. There are some connectivity requirements for aircraft communications, for example, to use in-flight entertainment (IFE) equipment. For example, passengers streaming or downloading movies, multi-media contents, text messages, and others, would need reliable connectivity between, for example, their seatback monitor, personal electronic devices (PEDs) (e.g., smartphone, laptops, or tablets). Similarly, passengers may be using their PED to shadow or share content on a display screen of the seatback monitor.

For example, passenger devices on the commercial passenger vehicle may connect to the internet or the world wide web through an on-board communication device (e.g., an on-board antenna). In other words, the on-board communication device may act as a gateway and no direct communication from the passenger devices to the internet may be possible. In many cases, due to electrophysical reasons and/or issues related to the on-board communication device, connectivity outage simply cannot be avoided. For examples, airplanes often fly in remote regions, e.g., polar flights, where there is simply no communication infrastructure available for data connectivity. In such cases, although outages cannot be completely prevented, passengers and operators of the commercial passenger vehicles would still find it beneficial to be able to predict probable occurrence of such outages in near future in order to plan their activities accordingly. In some situations, the capabilities of the on-board communication devices can be limited due to many factors, which include constantly changing environmental conditions, aircraft maneuvers, and sustained usage. The impaired capabilities of the on-board communication devices may lead to fail in its operation and a failure of the on-board communication devices will cause the connectivity outage. Here, an outage may mean a temporary disruption in service that may occur at a physical layer e.g., a loss of a physical signal that carries data communication or a severe degradation in the carrier signal to a point where too many errors occur in received or transmitted data. The outage may also occur at a higher layer such as data link layer due to data errors e. g., inability to correct errors using conventional schemes such as error correction codes and cyclic redundancy checks.

The techniques disclosed in this document can be used by various embodiments to provide outage prediction schemes for predicting a possible outage occurring during a travel on a commercial passenger vehicle. While there is no way in conventional technologies to accurately predict or obtain a prior information about an outage occurrence during a scheduled travel of the commercial passenger vehicle, the suggested technologies can be utilized to predict the possible outage that can occur during the travel. The prediction results can be utilized in various manners to increase the passenger experience. Some implementations of the disclosed technology provide outage prediction schemes for predicting a possible outage that is caused due to the failure of the on-board antenna. It can be beneficial for passengers and operators of the commercial passenger vehicles if they are able to predict probable occurrence of such outages due to the antenna failure and prevent the antenna failure by taking a maintenance or replacement of the on-board antenna in order to avoid possible outage. Although the implementations discuss the on-board antenna as the example of the on-board communication devices, the suggested technologies can be applied to other communication devices than the on-board antenna.

FIG. 1 shows an example of a configuration of an outage prediction system based on some implementations of the disclosed technology. In FIG. 1, the outage prediction server 120 is located at a ground and communicates with aircrafts 110a to 110n, satellites 130a to 130n, and external servers 140a to 140n. Each of the plurality of aircrafts 110a to 110n includes an IFE system that records operational and network data from antenna position sensors. The antenna position sensors can be located, for example, on the aircraft, at a ground terminal, a local base station, an airport communication tower, or others. The operational and network data includes a type (kind) of aircraft, a position of aircraft, a present aircraft flight route/course, a present direction of flight of planes in the fleet, a future direction of flight of planes in the fleet, an antenna position, an aircraft angle of flight, an aircraft destination information, an aircraft and or a fleet of prior, current, and future traffic patterns, flight course terrain (e.g., mountains, towers, lakes, oceans, historical communication signal drop-off locations, or others). In some implementations, the operational and network data is used by the outage prediction server 120 to optimize antenna beam usage to predict, to reduce, and/or to provide "early warning" of service interruptions.

In each aircraft, an edge server can communicate with an outage prediction server 120 via an antenna directly or through satellites 130a to 130n. Although the outage prediction server 120 is shown in FIG. 1 as being located on the ground, the outage prediction server 120 can be located in the cloud or at a remote location. The outage prediction server 120 can collect operational and network data from the aircrafts 110a to 110n and satellites 130a to 130n, and further collect additional data including past, present, and future aircraft and fleet data from external servers 140a to 140n. The external servers 140a to 140n may be located outside of the aircrafts and communicates with the ground terminal over the Internet, wired, or wireless networks using a variety of communication protocols.

Figure 2:
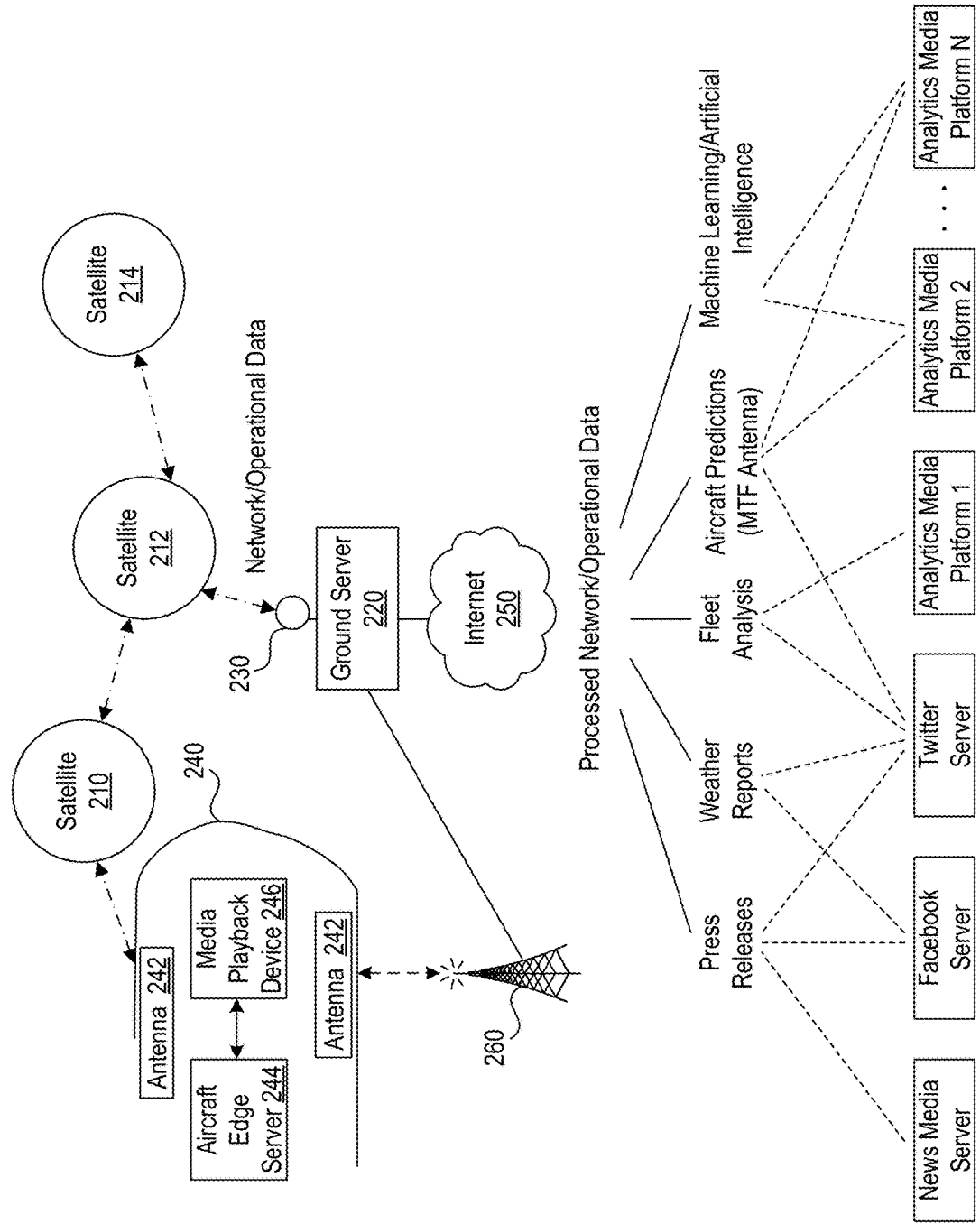
FIG. 2 shows another example of a configuration of an outage prediction system based on some implementations of the disclosed technology.

FIG. 2 shows another example of a configuration of an outage prediction system based on some implementations of the disclosed technology. In the example of FIG. 2, some elements of the aircraft 240 are shown, which include antennas 242, a media playback device 240, an aircraft edge server 244. The media playback device 246 is in communication with an edge server 244 and the aircraft 240 is in communication with a ground server 220 through an antenna 242 (on aircraft 528) via one or more satellites 210, 212, 214 and/or a terrestrial communication station 260.

The antenna 242 maybe sized and shaped to fit within the space specified by the relevant standard. For communication with geostationary satellites and providing a satisfactory communication experience for passengers on the aircraft 240, the antenna needs to satisfy certain characters related to antenna performance. For example, G/T is a factor typically used for characterizing antenna performance, where G the antenna gain in decibels in a receive frequency band, and T is the equivalent noise temperature in Kelvins. For example, the antenna 242 may be configured to provide a certain range of G/T depending on area features during a travel of the aircraft 240. The G/T values are simply provided as examples and are not to be construed as limiting the various adaptive aspects described herein.

For the communications between the ground server 220 and the aircraft 240, a ground server antenna 230 is further provided. The ground server 220 can retrieve network/operational data from the aircraft 240 using communication links through the antenna 242, one or more satellites 210, 212, 240, the ground server antenna 230, and/or the terrestrial communication station 260. In some implementations, the ground server 220 can be communicably coupled to the Internet 250 to retrieve processed network/operational data. The Internet 250 is the example only and other communication protocols can be used to enable the communications between the ground server 220 and additional servers/platforms.

As shown in FIG. 2, the processed network/operational data includes press releases, weather reports, fleet analysis, aircraft predictions, or machine learning/artificial intelligence. To obtain the processed network/operational data, the ground server 220 can be further in communication with various servers/platforms including news media server, social media server (e.g., Facebook or Twitter servers), one or more analytics media platforms. The machine learning/artificial intelligence module is employed to cooperate with the ground server 220 to provide the processed network/operational data obtained from various servers/platforms. The various servers/platforms can operate as sources of various data that is related to a travel by a commercial passenger vehicle and provide any related information such as weather reports, fleet information, aircraft information, etc., to the ground server 220 (and/or the machine learning/artificial intelligence module). Such data can be utilized by the ground server 220 (and/or the machine learning/artificial intelligence module) to perform the outage prediction.

Although it is shown in FIG. 2 that the machine learning/artificial intelligence module is implemented outside of the ground server 220, it is also possible that the ground server 220 is configured to include the machine learning/artificial intelligence module.

The machine learning/artificial intelligence (AI) module includes machine learning applications that perform various types of data analysis to automate analytical model building. Using algorithms that iteratively learn from data, machine learning applications can enable computers to learn without being explicitly programmed. The machine learning/AI module may be configured to use data learning algorithms to build models to interpret various data received from the various devices or components to detect, classify, and/or predict future outcomes. Such data learning algorithms may be associated with rule learning, artificial neural networks, inductive logic programming, and/or clustering. In some implementations, the machine learning/AI module may enable the ground server 220 to perceive their environment and take actions that maximize their prediction results for service outages. The machine learning/AI module may compile coded descriptions into lower-level structured data objects that a machine can more readily understand, build a network topology of the main problem concept and sub-concepts covering aspects of the problem to be solved, train codified instantiations of the sub-concepts and main concept, and execute a trained AI model containing one, two, or more neural networks. The machine learning/AI module can abstract away and automate the low-level mechanics of AI, and the machine learning/AI module can manage and automate much of the lower level complexities of working with AI. Each program developed in a pedagogical programming language can be fed into the machine learning/AI module in order to generate and train appropriate intelligence models. The machine learning/AI module can be a cloud-hosted platform configured to manage complexities inherent to training AI networks. Thus, the machine learning/AI module can be accessible with one or more client-side interfaces to allow third parties to submit a description of a problem in a pedagogical programming language and let the online AI engine build and generate a trained intelligence model for one or more of the third parties. In some embodiments, the machine learning/artificial intelligence module employs algorithms to predict an outage that affects a network connectivity during a travel by a commercial passenger vehicle based on various information. In some implementations, the machine learning/artificial intelligence module further suggests recommendations for beam usages/teleport usages/satellite usages to reduce and prevent possible outage occurrences. For example, the outage prediction system can map or chart patterns of satellite usage, and select a different satellite to mitigate outage occurrences during flights. In some implementations, the machine learning/artificial intelligence module further suggests modifications on a route of the travel based on prediction results of outages.

Figure 14:
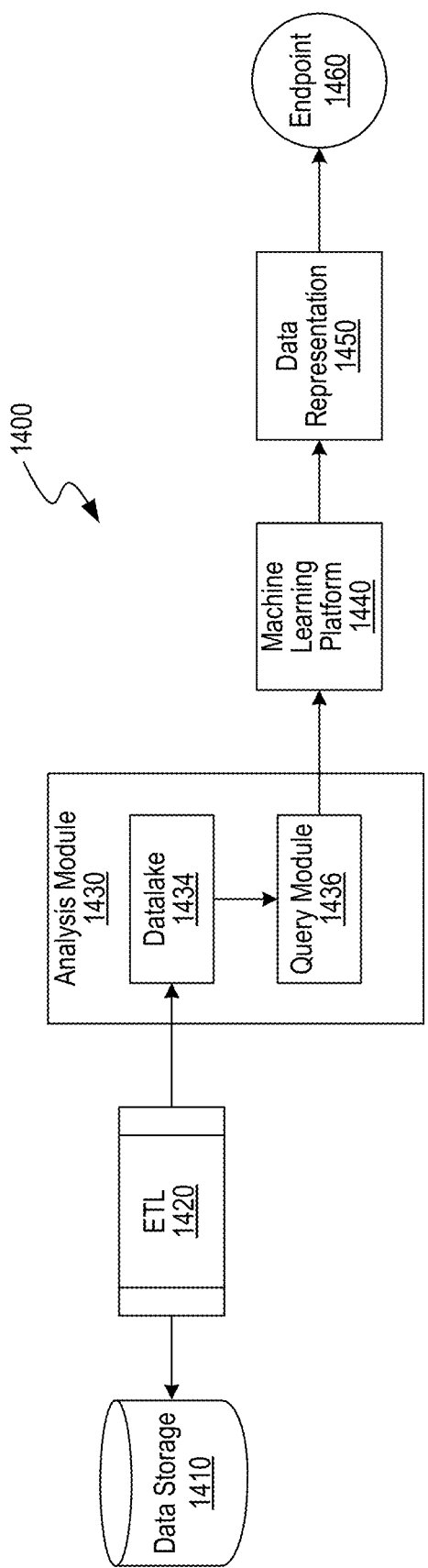
FIG. 14 shows an example of an outage prediction system to predict an antenna-related outage based on some implementations of the disclosed technology.

The ground server 220 can be configured to use a wide variety of resources including compute resources, storage resources, and other resources and predict a possible outage using various algorithms. For example, the ground server 220 operates to obtain information from news media server and/or social media servers and perform machine learning techniques to predict a service outage during a travel of the vehicle. For example, the ground server 220 can operate together with a teleport usage algorithm that predicts, documents (logs), and redirects teleport communication traffic to one or more best teleport beams based one or more factors including: historical weather data, live weather data, aircraft antenna positional information, aircraft antenna pointing angle, aircraft antenna line of sight measurements, feed-beam distribution patterns. While FIG. 2 shows the implementation that the outage prediction system is configured as the ground server 220, other implementations are also possible. For example, the outage prediction system can be configured in a cloud. In this case, the cloud platform for the outage prediction system exists with servers, processes, and databases, which are able to be connected connect over a wide area network, such as the Internet, from multiple computing devices and then the backend of the cloud platform is configured to handle the operations of the outage prediction system including operations discussed above for the ground server 220 in FIG. 2, by dynamically calling in additional computing hardware machines to load on and run the independent processes as needed. In some implementations, as to be mentioned with reference to the example as shown in FIG. 14, depending on the utilization of the outage prediction result, the ground server 220 may not need the real time communications with the aircraft. In that case, the ground server 220 can obtain necessary data for the prediction of the outage from the external servers or data storages in communication with the ground server 220.

Some embodiments of the disclosed systems and methods can be further configured to provide a result of an outage prediction in various manners. In some implementations, the outage prediction service can generate and provide an IFE outage map showing predicted future connectivity downtime, mapping predicted connectivity outages along the flight path including outage segments. In this case, the map shows all potential routes that will incur outages. The map is one example only and other implementations are also possible. For example, the outage prediction result can be provided using a list of possible outages. In some implementations, at least two other visualizations can be employed to provide the outage prediction result (for example, a map and a table or a listing of time intervals and corresponding outage probabilities).

The outage prediction result can be utilized in various manners. In some implementations, the outage prediction service can be used to adjust passenger Internet fees and service providers subscription fees and IFE advertisers' fees based on outage prediction information. In some implementations, the outage prediction service can be used to generate a warning and communicate the warning to passengers during a flight. In some implementations, the outage prediction service can be used to generate the prediction information and communicate the generated prediction information to aircraft companies and others before scheduled flights. In some implementations, the outage prediction service can further include recommendations about modifications of beam usages and/or redirecting of teleport communication traffics to avoid possible outage occurrences. In some implementations, the outage prediction service can be utilized by the Internet Service provider to prorate in-flight Internet usage service charges for Internet downtimes. In some implementations, when the prediction result is about the possible outage caused due to the antenna failure, the prediction result can be utilized before or after flights for the maintenance or replacement.

There can be various types of outages occurring during a travel of a commercial vehicle, e.g., tail blockage, polar outage, weather-related outage, and antenna-related outage, and the outage prediction systems and methods are configured to predict different types of outages. For predicting each of different typed outages, the system and method can employ different algorithms configured accordingly. Below is further discussion for each of different typed outages.

Tail Blockage Prediction

Figure 3:
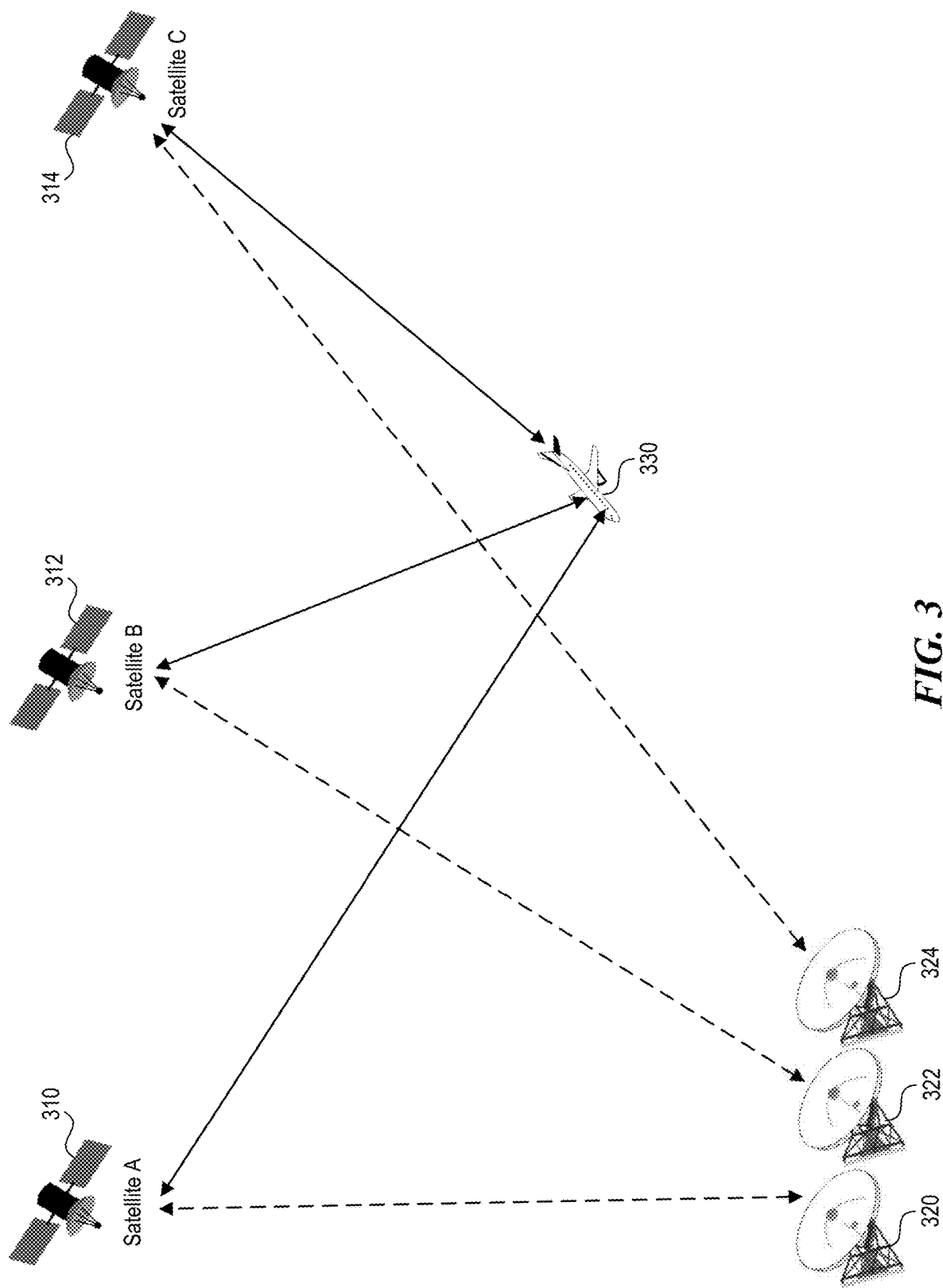
FIG. 3 shows an example of relative locations of an aircraft, a satellite and an antenna when a tail blockage occurs.

Some implementations of the disclose technology provide a tail blockage prediction. FIG. 3 illustrates an example of relative locations of an aircraft, a satellite and an antenna. In FIG. 3, the aircraft 330 communicates with satellite A 310, satellite B 312, satellite C 314, and antennas 320, 322, 324 to provide the vehicle entertainment system. The tail blockage occurs when a tail of the aircraft 330 is blocking a line of sight from an aircraft antenna to satellite C 314 because the tail of the aircraft 330 is in between the aircraft antenna and the satellite C 314. In FIG. 3, there is no tail blockage between the aircraft 330 and satellite A 310 or satellite B 312.

The tail blockage can be predicted when the aircraft tail is in between the aircraft antenna and any satellite available for each route. Thus, the tail blockage can occur when the aircraft is flying away from the satellite. In some cases, there may be multiple satellites available for a given route. In some other cases, there will be only one satellite for a route. All of the satellites that have capacity for a route will be used to predict the tail blockage. The outage prediction system may be configured to obtain data that is related to the tail blockage and determine the tail blockage using algorithms stored on the system. For example, the outage prediction system can predict the occurrence of the tail blockage using the conditions provided below.

Altitude: The calculation only includes aircraft altitudes >10,000 ft. Thus, locations on routes during a climb and descent will be excluded.

Azimuth: The azimuth indicates the horizontal angle of the aircraft relative to the satellite. An azimuth angle >176 degrees or <−176 degrees will likely cause some blockage of the signal.

Elevation: The elevation indicates the upward tilt (in degrees) of the antenna, relative to the orientation of the tail. The elevation is required to point the antenna at the satellite. A low elevation is more likely to incur tail-blockage. Elevation angles used for tail blockage are >=5 degrees and <40 degrees.

The outage prediction system can employ algorithms to predict the tail blockage occurrence based on conditions above. The outage prediction system may obtain flight data including altitude, azimuth, elevation before flights and can provide the prediction result before the flights. In some implementations, the outage prediction system can further provide recommendations to modify a travel route to reduce or avoid a possible outage occurrence. In some embodiments, the outage prediction system may use information about which equipment will be used for the planned travel. Depending on a configuration of antennas on the body of the equipment in relation to the tail of the aircraft, the outage prediction system may determine segments along a travel path during which there is a high probability (e.g., above a threshold such as 50%) of occlusion of a satellite by a tail intervening the connection between the satellite and antennas fitted on the aircraft body.

Figure 4:
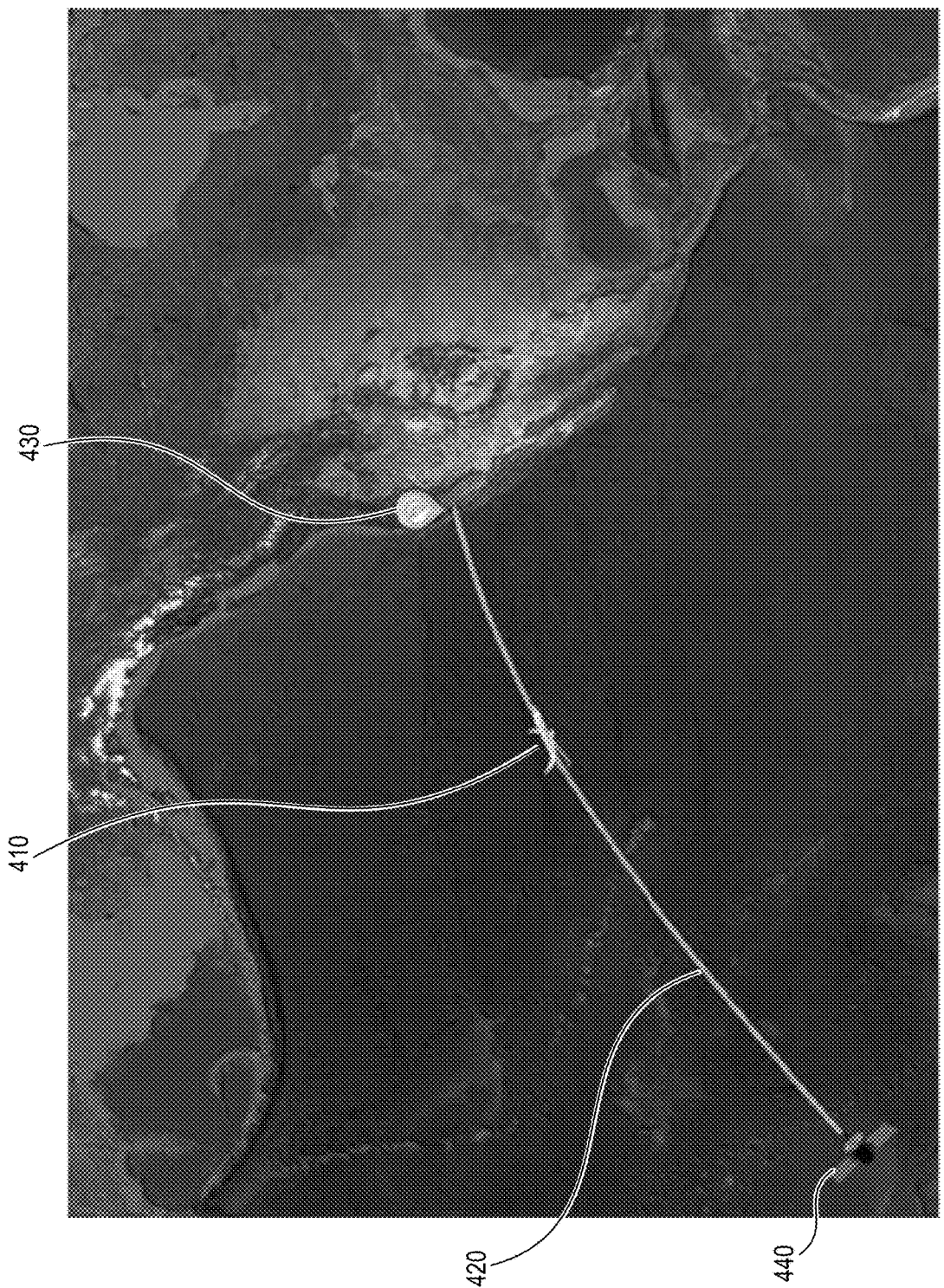
FIG. 4 shows an example of a flight route that experiences a tail blockage.

FIG. 4 shows an example of a route of an aircraft in which a tail blockage occurs. The example screen shown in FIG. 4 can be provided as the result of the prediction. In FIG. 4, an aircraft 410 travels along a route 420 to San Francisco International Airport (SFO) 430. The aircraft communicates with the satellite 440 for providing inflight services. Anywhere along the route 420 will likely experience some tail blockage because the satellite 440 is behind the aircraft 410 such that the tail of the aircraft 410 is located between the aircraft antenna and the satellite 440. Traveling away from the SFO 430 along the route 420, however, will not experience tail blockage because the satellite is in front of the aircraft.

The outage prediction system can calculate probabilities of tail-blockages on routes based on the history of latitude/longitude positions for the same route. Such history information can be stored in the cloud or any other locations. In addition to probabilities of tail-blockages, the algorithms also learn the probability of flights being impacted by tail-blockages and the percentage of in flight hours being impact by tail-blockages for impacted flights.

Figure 5:
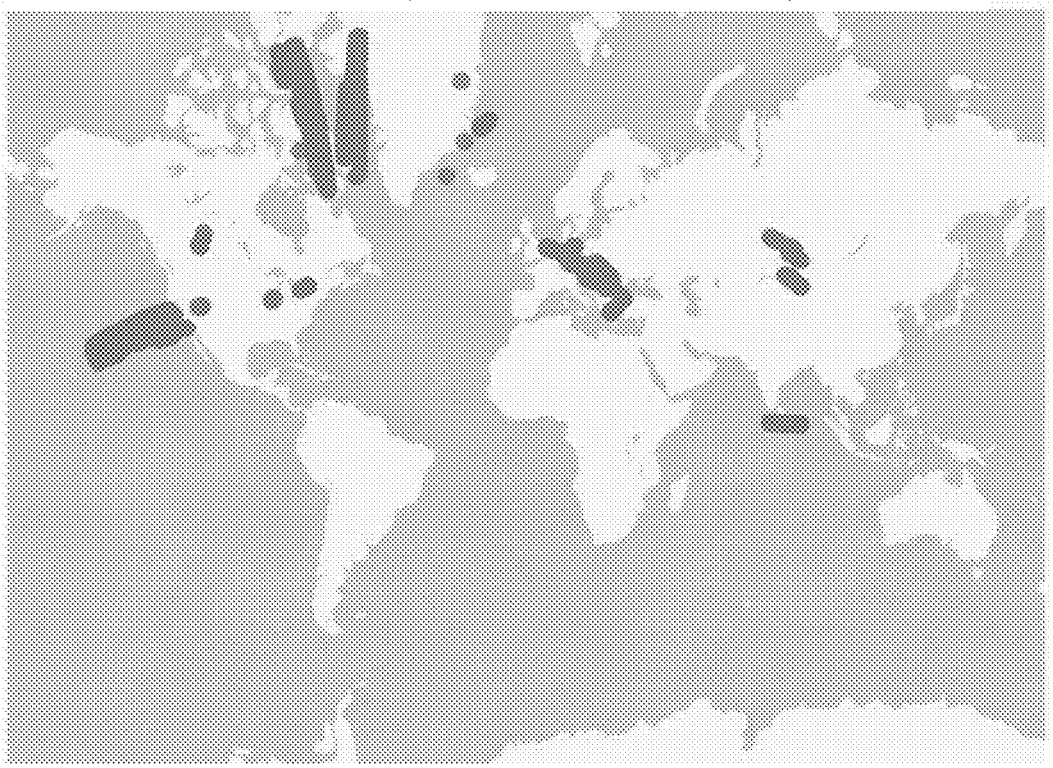
FIG. 5 shows examples of prediction results indicating a tail blockage occurrence based on some implementations of the disclosed technology.
Figure 5:
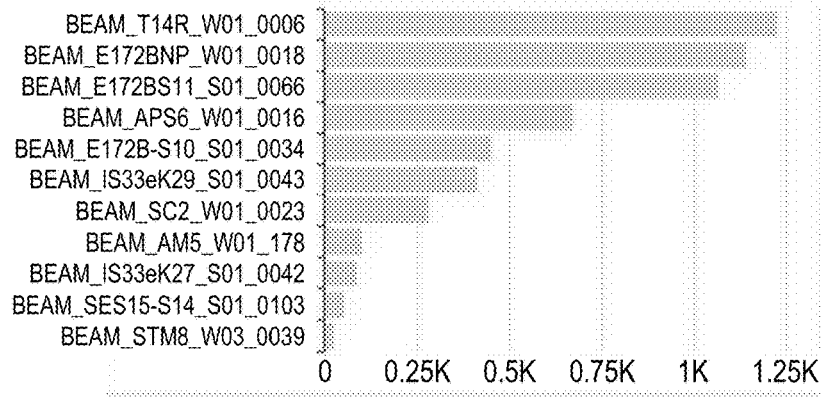
Figure 5:
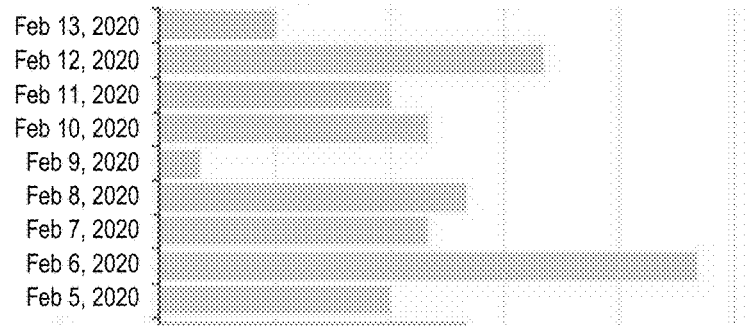

FIG. 5 shows an example of a prediction result provided by the outage prediction system. In FIG. 5, the map 510 shows a tail blockage distribution by latitude and longitude, the chart 520 shows the tail blockage distribution by beam, and the chart 530 shows the tail blockage distribution by take-off date.

Polar Satellite Outage Prediction

Some implementations of the disclose technology provide a polar satellite outage prediction. The polar outage interruption can occur when an elevation is so low that the aircraft antenna cannot communicate a satellite signaling to the aircraft. In some implementations, the polar outage prediction is calculated using an algorithm predicting the polar outage prediction when the aircraft elevation is at a very high latitude (e.g., greater than 70 degrees N) and the elevation is very low (e.g., less than 5 degrees).

Figure 6:
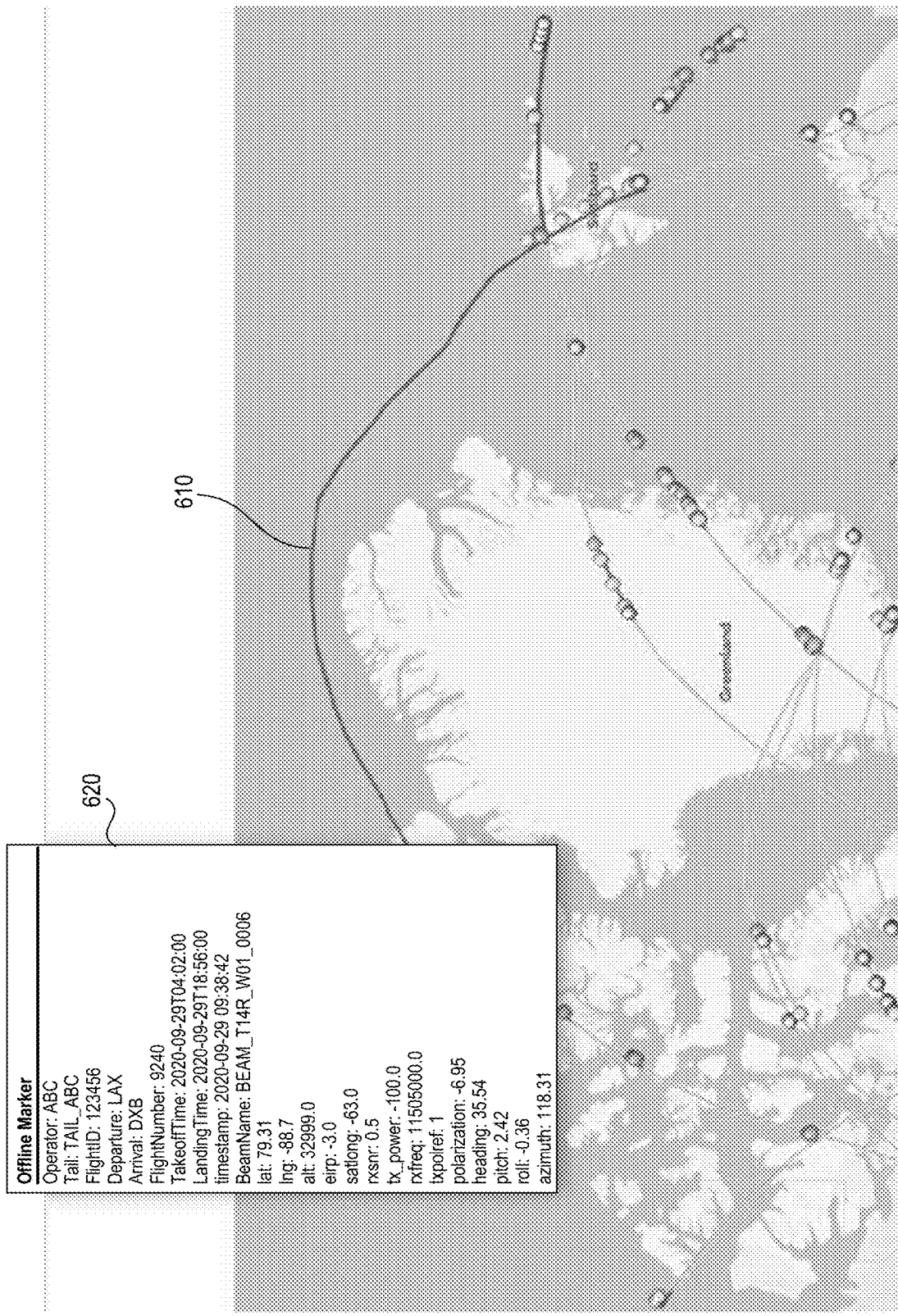
FIG. 6 shows an example of a flight route that experiences a polar outage.

FIG. 6 shows an example of a result that is provided as the polar satellite outage prediction. In FIG. 6, the result shows the map including various flight routes including a flight route 610 that is predicted to have a polar outage interruption. There can be many methods employed to display the flight route that is expected to have a polar outage interruption differently from other routes. There is information window 620 including detailed information about the flight route 610 that is predicted to have the polar outage interruption.

Elevation can be defined as the upward tilt to a satellite antenna measured in degrees and required to aim the antenna at the communications satellite. When aimed at the horizon, the elevation angle is zero. If it were tilted to a point directly overhead, the satellite antenna would have an elevation of 90 degrees. This can be considered as the angle from the aircraft to the satellite. With the Earth's curvature, elevation that is less than 5 degrees is typical in polar outages.

In some implementations, polar outages can be determined using the conditions below.

Altitude: The calculation only includes aircraft altitudes >10,000 ft. Thus, locations on routes during a climb and descent will be excluded.

Latitude: Restricting the calculations to latitudes >70 degrees N ensures no false positives as a result of aircraft maneuvers.

Elevation: The elevation indicates the upward tilt (in degrees) of the antenna, relative to the orientation of the tail. The elevation is required to point the antenna at the satellite. The plane typically cannot "see" the satellite at elevations that are less than 5 degrees.

The outage prediction system can employ algorithms to predict the polar outage occurrence based on conditions above. The outage prediction system may obtain data including altitude, latitude, elevation before a flight and can provide the prediction result before the flight.

Figure 7:
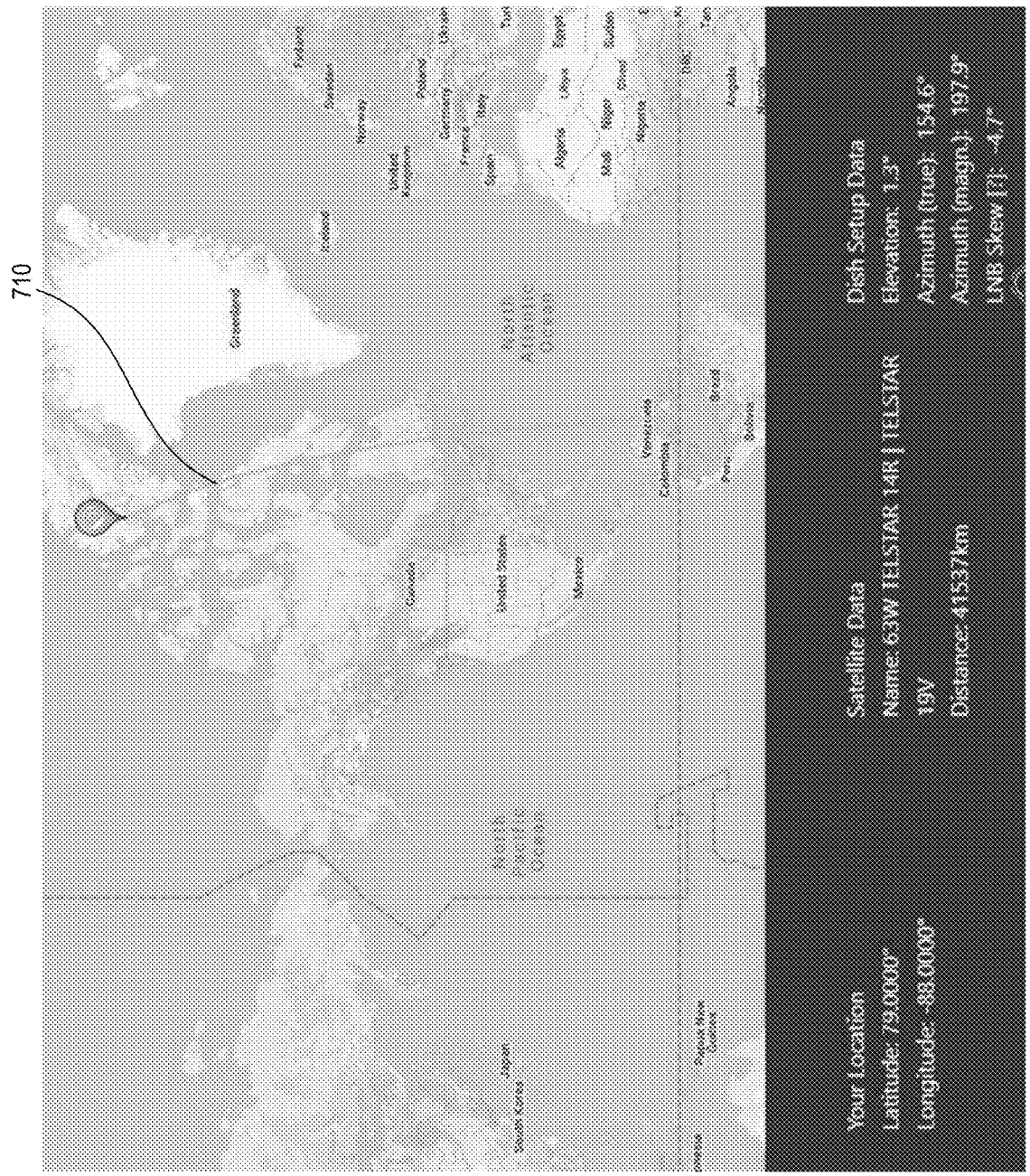
FIG. 7 shows another example of a flight route that experiences a polar outage.

FIG. 7 shows an example of data with very low elevation (1.3 degrees) at a typical latitude, longitude pairing (79N, 88 W) that occurs during flight routes that cross the North Polar region e.g. a flight route from Los Angeles to Dubai.

In some implementations, the probabilities of polar outages on routes can be calculated by the history of latitude/longitude positions for the same route in the cloud. In addition to probabilities of polar outages, the algorithms also learn the probability of flights being impacted and the percentage of in flight hours being impacted by polar outages for impacted flights.

Two examples of a logic are shown in the below, which can be used to predict the polar outage prediction. The logic can be implemented by the outage prediction system through various algorithms.

The example logic, which is shown in Table 1, uses flight information data, for example, FCC (Federal Communications Commission) regulation data and/or flight history data, to predict a polar outage.

TABLE 1

| Math | Notes | Impacts QOE? |
|---|---|---|
| altitude: \>10000 AND in network: 0 AND elevation: <=5 AND latitude: >70 | For Phase 1, to ensure accuracy/confidence in the model, binary/concrete polar outage can be used, (e.g., TRUE polar outages where it caused an out of network event, i.e., in_network = 0.) Altitude is gated as >10000 feet since there are obviously maneuvers on takeoff, which can be ignored. Elevation is the upward tilt to a satellite antenna measured in degrees required to aim the antenna at the communications satellite. When aimed at the horizon, the elevation angle is zero. If it were tilted to a point directly overhead, the satellite antenna would have an elevation of 90 degrees. Elevation <5 deg is typical in polar outages Latitude is fairly obvious: This "gate" can be added since some maneuvers at lower latitudes could cause elevation <5 deg but this would obviously not be a polar outage. | Yes - the tail is knocked out of network hence the passenger loses WiFi |

Another example logic predicts the polar outage using a satellite map. The satellite map has a polar outage definition bounded by geo-marker, e.g., "Zone" that is marked in the map. The example logic creates a table ordered with the worst route displayed in the first row and best route in the last row. The example logic can display 10 to 15 worst routes from actual polar outages data from offloads. Routes with only one flight need to be ignored and left out because it may skew the order.

Below is an example showing a few routes with the worst shown in the first row and best in the last row. The example logic will display the data shown in Table 2 below at a minimum.

TABLE 2

Top Routes Polar Outages Summary

| Route | % Polar Outage | % of Flights likely be affected | Flight Count on the Route | Flight Count affected | # of Records affected | # of Records | mean_perc_inflighttime_noservice |
|---|---|---|---|---|---|---|---|
| LAX-DXB | 14% | 80% | 25 | 21 | 3897 | 158900 | 0.1463 |
| DEL-EWR | 12% | 50% | 10 | 3 | 1045 | 11003 | 0.1276 |

The actual flight path (latitude/longitude points) of routes may change based on the time of year and season. So, the worst route may be different though out the year when using the same routes and satellites. In addition, there may be multiple beams per route with polar outage (although polar outages typically occur in T14R).

Weather-Related Outage Prediction

Some implementations of the disclose technology provide a weather-related outage prediction, given that weather impacts network connectivity between devices inside the vehicle and satellites.

Figure 8:
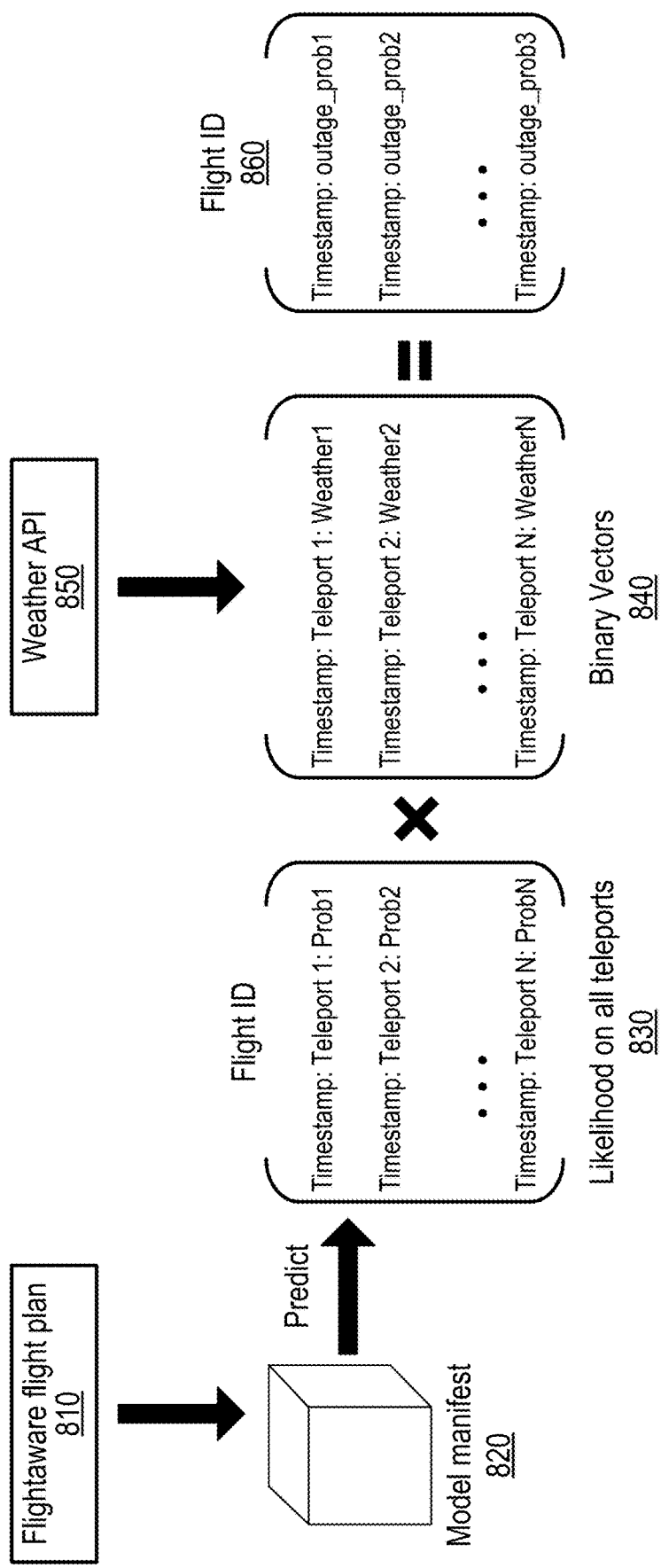
FIG. 8 shows an example of an algorithm that is used to predict a weather-related outage.

FIG. 8 shows an example of an algorithm that is used to predict the weather-related outage. In FIG. 8, flight data of a certain flight with a flight ID is input to an algorithm model. In FIG. 8, as the example, the flight plan from FlightAware is provided to the algorithm model. The flight data may include flight positions (e.g., Radar, ADS-B, Mode S Multilateration (MLAT), datalink, etc.) as well as flight status data (e.g., flight plans, departure/arrival messages, flight updates) and surface movement positions. The algorithm provides an outrage predict result for a corresponding flight ID using 1) likelihoods on all teleports and 2) binary vectors that are derived from a weather API. A teleport is a ground station designed for communications with satellites and teleports are located at multiple places around the globe allowing the teleports line of sight communication with satellites. The likelihood of teleport shows possibilities of a certain flight communicating with a corresponding teleport at a particular time. The obtaining of the likelihoods on all teleports will be further discussed later with regard to FIG. 10. The weather API may be configured to communicate with one or more external weather providers. The input from the weather API may facilitate integrating weather information (e.g., current weather data, weather forecasts, historical data, based on location and others).

Figure 9:
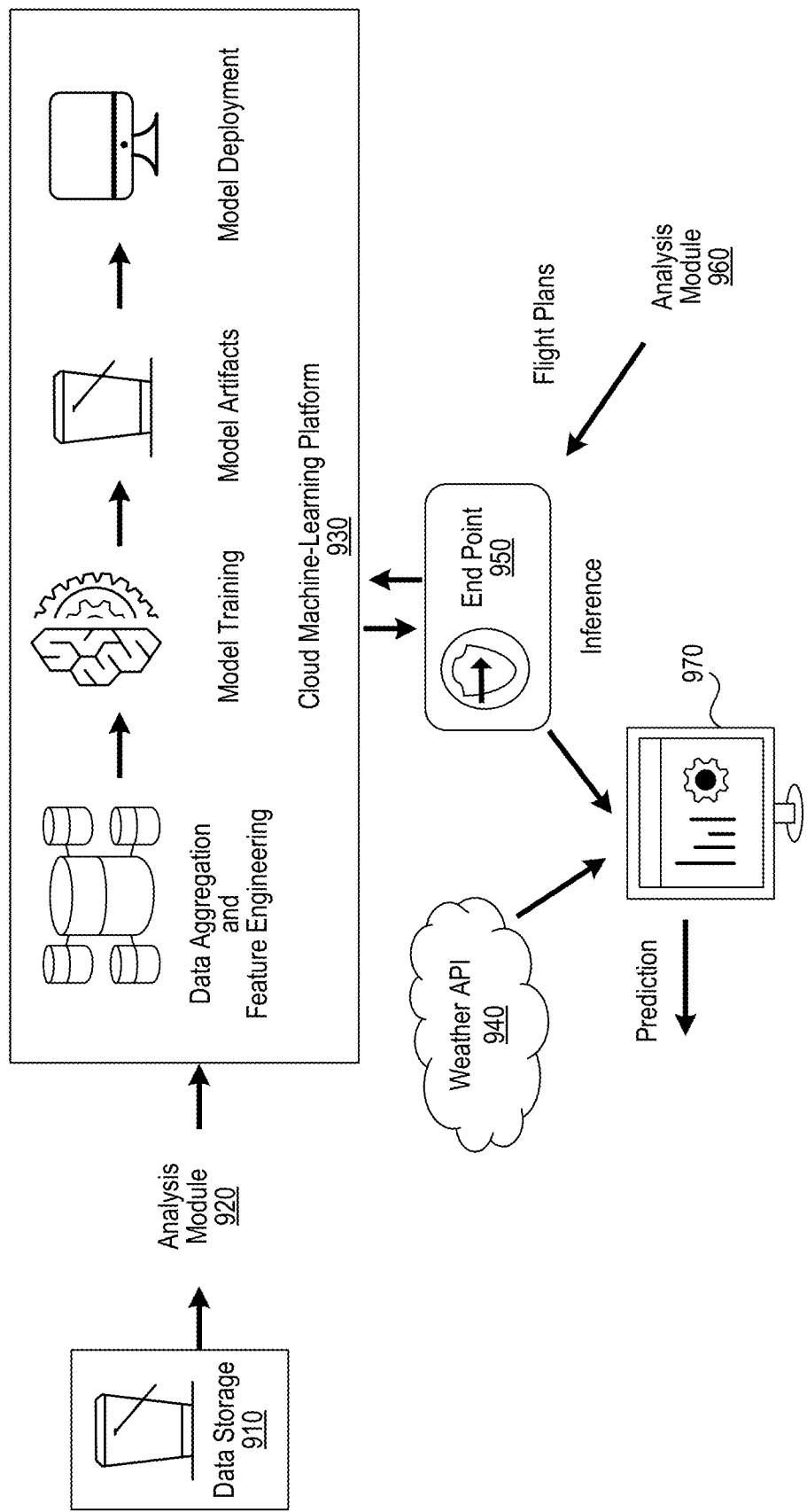
FIG. 9 shows an example of a deployment of an algorithm to predict a weather-related outage.

FIG. 9 shows an example of a deployment of an algorithm to predict the weather-related outage. The data storage 910 stores data that is related to an outage occurrence prediction, and data obtained from the data storage 910 is analyzed by algorithm(s)/model(s) 920. The cloud machine-leaning platform 930 receives the analyzed data from the block 920 and further process operations to predict an outage occurrence (e.g., data aggregation and feature engineering, model training, an application of model artifact, and/or an application of a model deployment). The result form the cloud machine-learning platform 930 is sent to the endpoint 950 to which flight data is sent from the analysis module 940. The prediction module 970 receives weather data from data storage e.g., weather API 940, as well as data from the endpoint 950 and outputs a prediction result. At least some of the components as shown in FIG. 9 can be executed either through custom programming and/or usage of standard or open source tools.

In some implementations, based on all collected or predicted weather information and current/predicted teleport usage, reconfiguring teleport usage before and/or during flight in real time is performed to maximize directly of teleport beams having none or minimal weather concerns with the aircraft antenna. In some implementations, current/predicted teleport usage includes adjusting usage in the air by nearby aircraft of the teleport beams and receiving and transmitting predictive information to and from a ground terminal.

Figure 10:
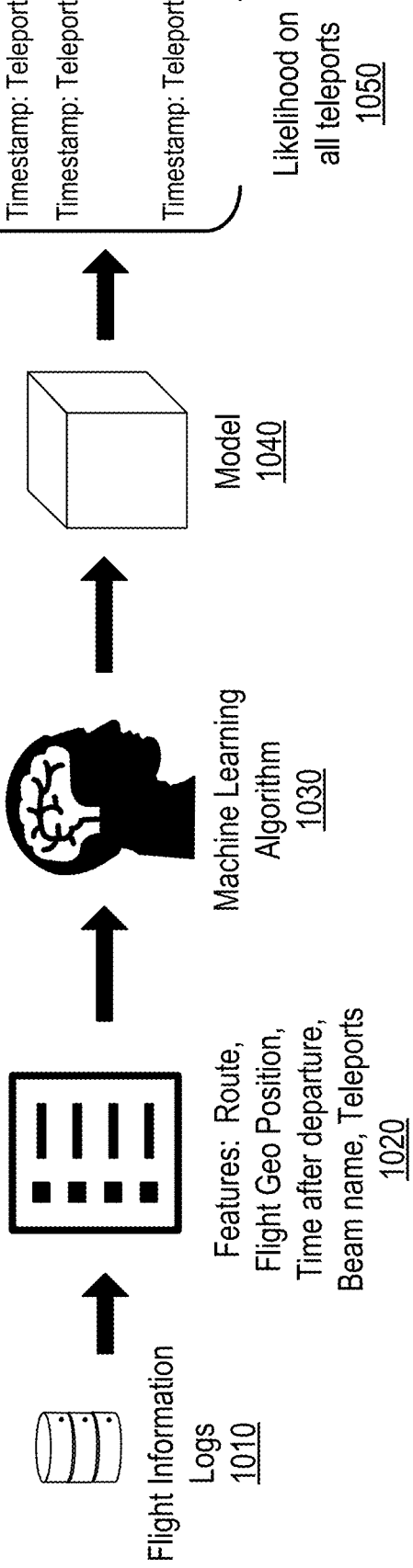
FIG. 10 shows an example of a prediction to obtain likelihoods of teleports.

FIG. 10 shows an example of a prediction to obtain likelihoods of teleports. As discussed with reference to FIG. 8, the likelihoods of teleports are used to predict the weather impact. In FIG. 10, flight information data is provided at 1010. At 1020, features including routes, flight geographic positions, beam names, teleports information, time information are retrieved from the flight information data. At 1030, the machine learning algorithm is applied and builds a model to interpret various data. At 1040, the model built by the machine learning algorithm is applied and as the output, the likelihood data is obtained at 1050.

Antenna-Related Outage Prediction

While an IFE connectivity may suffer due to various connectivity issues, an on-board antenna can cause some connectivity issues as passenger devices on the commercial passenger vehicle may connect to the internet or the world wide web through an on-board antenna. For example, to have the network connectivity on the commercial passenger vehicles from/to a ground terminal or a satellite link, the on-board antenna may act as a gateway and allow the communications from the passenger devices to the internet. There exist many factors, however, that impact the capabilities of the on-board antenna, which include constantly changing environmental conditions, aircraft maneuvers, and sustained usage. The impaired capabilities of the on-board antenna may lead to fail in its operation and a failure of the antenna will cause the connectivity outage. Although such connectivity outages due to antenna failures cannot be completely prevented, passengers and operators of the commercial passenger vehicles would still find it beneficial to be able to predict probable occurrence of such outages due to the antenna failure and prevent the antenna failure by taking a maintenance or replacement of the on-board antenna in order to avoid possible outage. In some implementations, the outage caused due to antenna failures include any outages that is caused related to a failure of the antenna.

Some implementations of the disclosed technology provide outage prediction schemes for predicting a possible outage occurring due to an antenna failure. By predicting the possible outage caused due to the antenna failure, it is possible to take a maintenance or replacement of the antenna system, thereby reducing the risk of the connectivity outage during the travel. Furthermore, predicting antenna failures ahead of actual occurrence of failure will also benefit ground crew and maintenance crew to attend to antenna hardware repair and replacement while aircrafts are scheduled for routine maintenance downtime.

FIG. 14 shows an example of an antenna-related outage prediction system that is used to predict an antenna failure. For example, FIG. 14 suggests a cloud-based machine learning development environment to train, build and deploy machine learning models to predict a most likable antenna failure. The algorithms use fault traps data (via log offloads) to predict when the aircraft antenna needs maintenance or replacement. The outage prediction results may be available via at least one or both dashboard and machine learning API to customers enabling replacement during scheduled maintenance, thereby avoiding unscheduled downtime. At least some of the components as shown in FIG. 14 can be executed either through custom programming and/or usage of standard or open source tools.

In the example of FIG. 14, the antenna-related outage prediction system can use fault trap data via log offloads to determine the antenna-related outage of the network connectivity that is caused due to a failure of the antenna. In some implementations, the antenna-related outage prediction system employs a function/software to produce fault traps, which are event driven log entries relating to a particular antenna error type. For example, an antennaTx-SetToOffTrap can be triggered, e.g. from an Antenna BUC (Block Up Converter) shutdown due to over-temperature conditions. Using the fault trap data is one example of the data analysis that is utilized to determine the probability of the outage occurrence. Other data analysis techniques can be used in various implementations. In some examples, the data storage 1410 can employ an appropriate protocol, e.g., Syslog (System Logging Protocol). The data storage 1410 collects flight logs from multiple flights for monitoring and review. In some implementations, the data storage 1410 can collect flight logs during flight descent from the flights. Flight logs may include flight data for a life of a corresponding aircraft and includes flight information such as takeoff and landing time. In some implementations, the data storage 1410 may communicate with the edge servers in the aircrafts and collect operational and network data and additional data from the aircrafts 110a to 110n, satellites 130a to 130n, and/or external servers 140a to 140n, which will be discussed with reference to FIG. 1.

The data integration module 1420 can operate together with the data storage 1410 to deliver the data to the analysis module 1430 for the analysis. The data integration module 1420 can be implemented using, for example, an ETL (extract, transform, load) tool. In some implementations, the data integration module 1420 can be configured to enforce certain data quality and consistency standards and/or conforms data so that separate sources can be used together. The data integrated by the data integration module 1420 can include various data, e.g., flight identification data (e.g., flight ID, flight number), antenna related data (e.g., antenna identification number, maintenance histories), flight travel data (e.g., flight schedules including departure/arrival time, flight position information, and/or surface movement information). Although FIG. 14 shows a single data storage 1410 and a single data integration module 1420, multiple data storages and multiple data integration modules can be provided. In addition, the data storage 1410 and the data integration module 1420 can be configured as one element that provides necessary data for the analysis by the analysis module 1430.

The analysis module 1430 may perform a comparative analysis on the data received from the data integration module 1420 and the data storage 1410 using algorithm(s)/model(s). In some examples, the algorithm(s)/model(s) implemented by the analysis module 1430 analyze the data in terms of antenna failures based on various information received from the data storage 1410 and the data integration module 1420. As an example, FIG. 14 shows that the analysis module 1430 includes a data lake 1434 and a query module 1436. The data lake 1434 may refer to a data storage repository that consolidates and stores the antenna-related data involved in analyzing the antenna failure and performing the prediction of a possible antenna failure. In some implementations, an ETL tool can be further provided in the analysis module 1430 to facilitate the providing of data to the data lake 1434 from the data storage 1410 and the data integration module 1420. The analysis module 1430 can include the query module 1436 to query the data lake 1434 for stored data using query parameters. For example, a processing engine of the data lake 1434 may extract and/or process portions of the stored data to comport with the performance metrics specified within the query parameters, and may transmit the extracted and processed data to the query module 1436.

In an example, the query module 1436 can employ a logic, e.g., traps query logic, to query data. The data lake 1434 and the query module 1436 are illustrated as one example of the analysis algorithms/models but various implementations can be used for the analysis of the data. Although FIG. 14 shows the data lake 1434 as the example, the analysis module 1430 can be implemented as a web based platform hosted on a server or a network of servers accessible via a network, for example, the internet, a wireless network, a mobile telecommunication network, etc. In some implementations, the analysis module 330 can be implemented in a cloud computing environment that refers to a processing environment comprising configurable computing physical and logical resources, for example, networks, servers, storage media, virtual machines, applications, services, etc., and data distributed over the network, for example, the internet.

The machine learning platform 1440 receives the analyzed data from the analysis module 1430 and further process operations to predict an antenna-related outage occurrence (e.g., data aggregation and feature engineering, model training, an application of model artifact, and/or an application of a model deployment). In an example, weighted rules (e.g., regarding trap importance) can be provided to the machine learning platform 1440. The weighted rules may apply different weights to the fault trap data to determine the probability of the antenna-related outage. The result from the machine-learning platform 1440 is sent to the data representation module 1450 and then sent to the endpoint 1460. Although the analysis module 1430 and the machine learning platform 1440 are shown as separate elements in FIG. 14, it is possible to combine those two elements into a single one to perform both analysis and machine learning process.

Figure 15B:
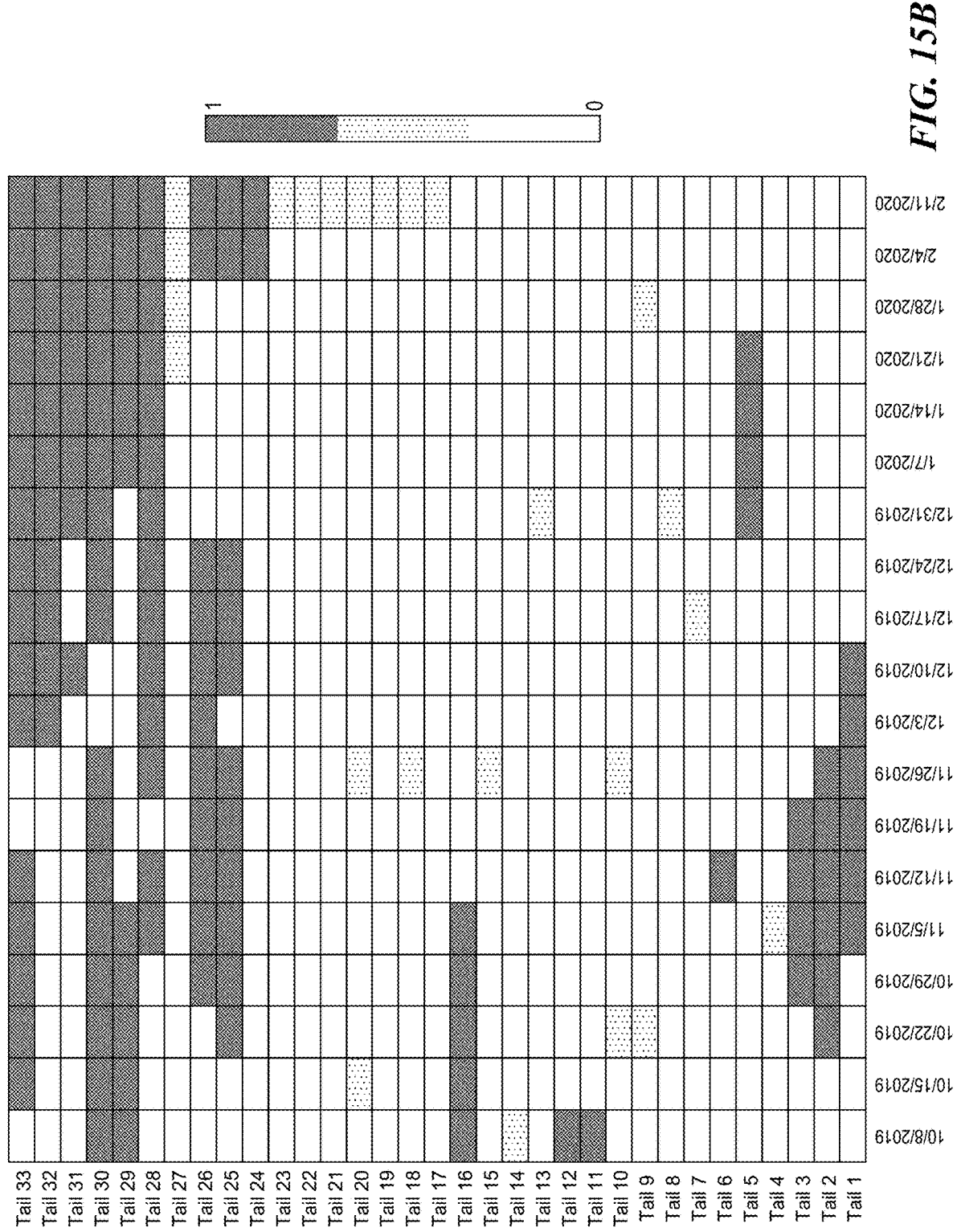
FIGS. 15A an 15B show examples of an outage prediction result that is provided at an endpoint of an outage prediction system based on some implementations of the disclosed technology.

The data representation module 1450 can be configured to provide an outage prediction result in various representations. In some implementations, the data representation module 1450 can be implemented as a dashboard or an application programming interface (API gateway). For example, the data representation module 1450 can provide the outage prediction result as shown in FIGS. 15A and 15B. In some implementations, the outage prediction system can be configured to provide a notification for the maintenance or replacement based on the antenna prediction score.

FIG. 15A shows an example of an outage prediction result that is provided at an endpoint of an outage prediction system. Each row of the table as shown in FIG. 15A includes a flight name, an operator name of a flight, an antenna serial number, and antenna failure prediction score. If multiple antennas are included in a single flight, the multiple antennas can be identified using their antenna serial numbers. In the example, the antenna failure prediction score is in a range from 0 to 5 and as the antenna failure prediction score is higher, the outage prediction system predicts higher chances for the corresponding antenna to fail. The score range can be varied based on various implementations.

FIG. 15B show an example of an outage prediction result that is provided at an endpoint of an outage prediction system. The example as shown in FIG. 15B can be provided together with or separately from the example as shown in FIG. 15A. The horizontal axis indicates dates and the vertical axis indicates flight tails on which a corresponding antenna is located. In the example of FIG. 15B, the failing status of the on-board antenna system are indicated in the graph using colors. The scale bar from 0 to 1 is indicated on the right side of the graph with a corresponding color. In the example, the grey color is used to indicate the scale that is closer to 1 and the white color is used to indicate the scale that is closer to 0. The outage chances become higher with the scale closer to 1.

Although FIGS. 15A and 15B show examples of the table and the graph that are used to provide a result of an outage prediction, the result can be provided in various manners without being limited to those as shown in FIGS. 15A and 15B.

The antenna-related outage prediction result can be utilized in various manners. In some implementations, the antenna-related outage prediction result can be utilized before or after flights for the maintenance or replacement of the antenna. For example, the antenna-related outage prediction system is further configured to provide a notification for the maintenance or replacement based on the outage prediction result. In some implementations, the antenna-related outage prediction result can be utilized during actual flights. For example, the antenna-related outage prediction service can be used to adjust passenger Internet fees and service providers subscription fees and IFE advertisers' fees based on outage prediction information. In some implementations, the antenna-related outage prediction service can be used to generate a warning and communicate the warning to passengers during a flight. In some implementations, the antenna-related outage prediction service can be used to generate the prediction information and communicate the generated prediction information to aircraft companies and others before scheduled flights. In some implementations, the antenna-related outage prediction service can be utilized by the Internet Service provider to prorate in-flight Internet usage service charges for Internet downtimes.

Referring back to FIG. 1, depending on utilizations of the outage prediction result (e.g., whether it is utilized during flights or before/after flights), the outage prediction server 120 may not need to be in real time communications with the aircrafts 110a to 100n and satellites 130a to 130n. When the outage prediction server 120 is not in real time communications with the air crafts 110a to 100n and satellites 130a to 130n, the outage prediction server 120 can collect the operational and network data from the external servers 140a to 140n that store the operational and network data of the flights that have been already completed.

Figure 11:
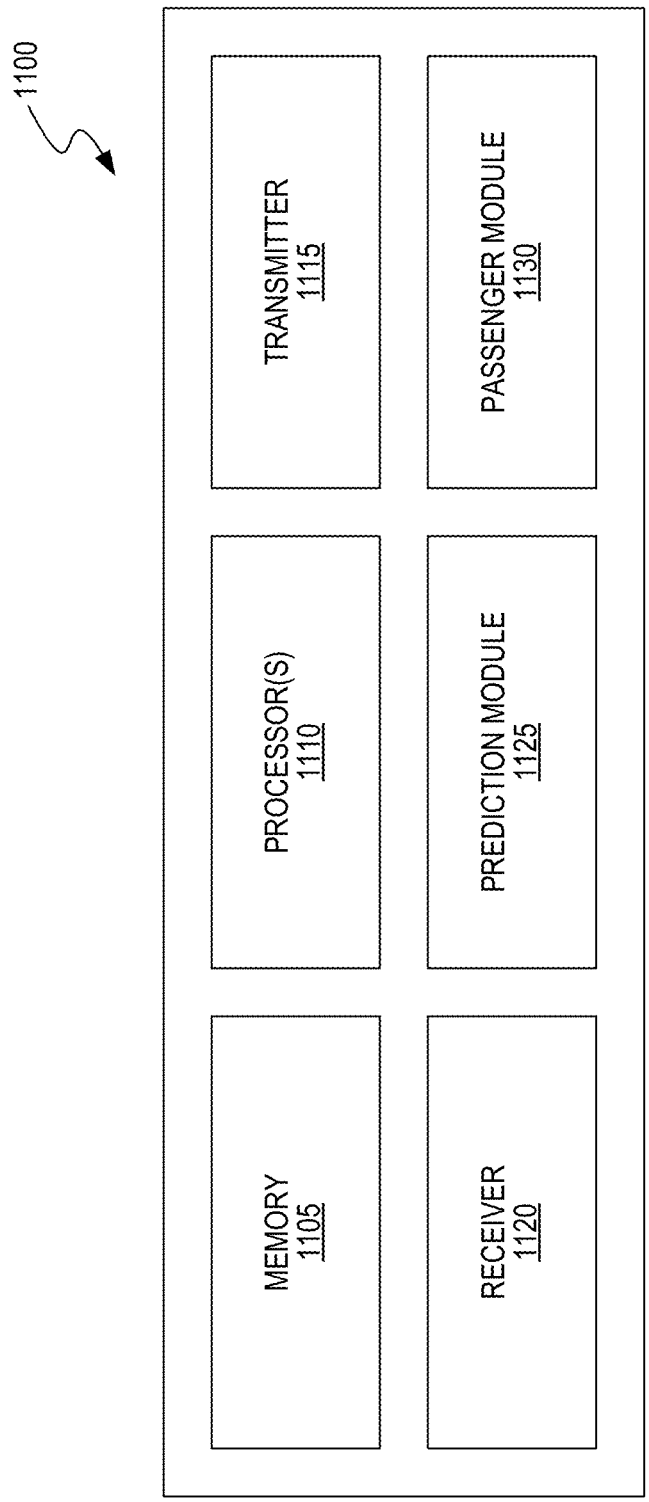
FIG. 11 shows an example of a block diagram of a ground server based on some implementations of the disclosed technology.
Figure 13:
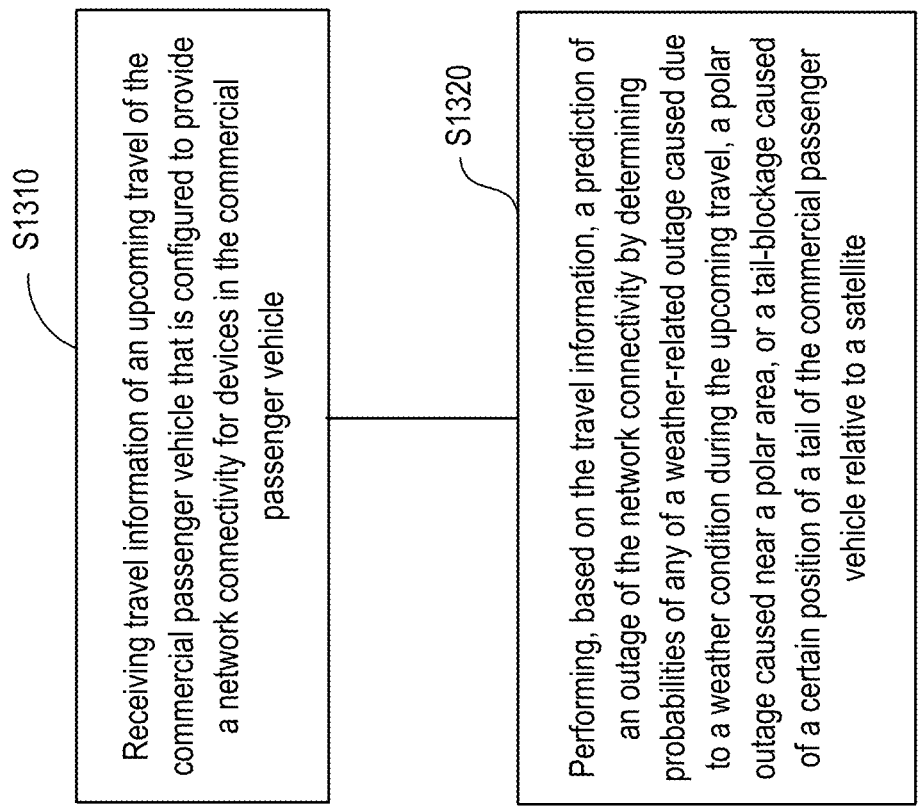
FIG. 13 shows a flowchart of an example method of a method for predicting an outage for a commercial passenger vehicle

FIG. 11 shows an example of a block diagram of a ground server based on some implementations of the disclosed technology. The ground server is shown in FIG. 2 as the implementation of an outage prediction server. In FIG. 11, the ground server includes at least one processor 1110 and a memory 1105 having instructions stored thereupon. The memory 1105 may store instructions to be executed by the processor 1110. In other embodiments, additional, fewer, and/or different elements may be used to configure the ground server 1100. The memory 1105 is an electronic holding place or storage for information or instructions so that the information or instructions can be accessed by the processor 1110. The memory 1105 can include, but is not limited to, any type of random access memory (RAM), any type of read only memory (ROM), any type of flash memory, etc. Such as magnetic storage devices (e.g., hard disk, floppy disk, magnetic strips, etc.), optical disks (e.g., compact disk (CD), digital versatile discs (DVD), etc.), smart cards, flash memory devices, etc. The instructions upon execution by the processor 1110 configure the ground server 1100 to perform the operations (e.g., the operations, for example, as shown in FIG. 13) which will be described in this patent document. The instructions executed by the processor 1110 may be carried out by a special purpose computer, logic circuits, or hardware circuits. The processor 1110 may be implemented in hard ware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 1110 can perform the operations called for by that instruction. The processor 1110 operably couples with the memory 1105, transmitter, 1115, the receiver 1120, the prediction module 1125, and the passenger module 1130, etc. to receive, to send, and to process information and to control the operations of the ground server 1100. The processor 1110 may retrieve a set of instructions from a permanent memory device such as a ROM device and copy the instructions in an executable form to a temporary memory device that is generally some form of RAM. In some implementations, the ground server 1100 can include a plurality of processors that use the same or a different processing technology. The transmitter 1115 transmits or sends information or data to another device (e.g., other servers as shown in FIGS. 1 and 2). The receiver 1120 receives information or data transmitted or sent by another device (e.g., other servers as shown in FIGS. 1 and 2). The prediction module 1125 of the ground server 1100 is configured to perform operations to predict outage occurrence as discussed above. In some implementations, the prediction module 1125 can be configured as a part of the processor 1110. The passenger module 1130 of the ground server 1100 is configured to obtain information on passengers including names, prior travel histories, current travel information, any preselected movie list, preselected point of interests, interests, hobbies, etc. The passenger information can be obtained in multiple manners and stored in the passenger module 1130 and utilized to select and provide customized contents and/or other in-flight service purposes. The passenger information can be obtained by the airlines and/or by a third-party prior to boarding of a corresponding passenger.

Figure 12:
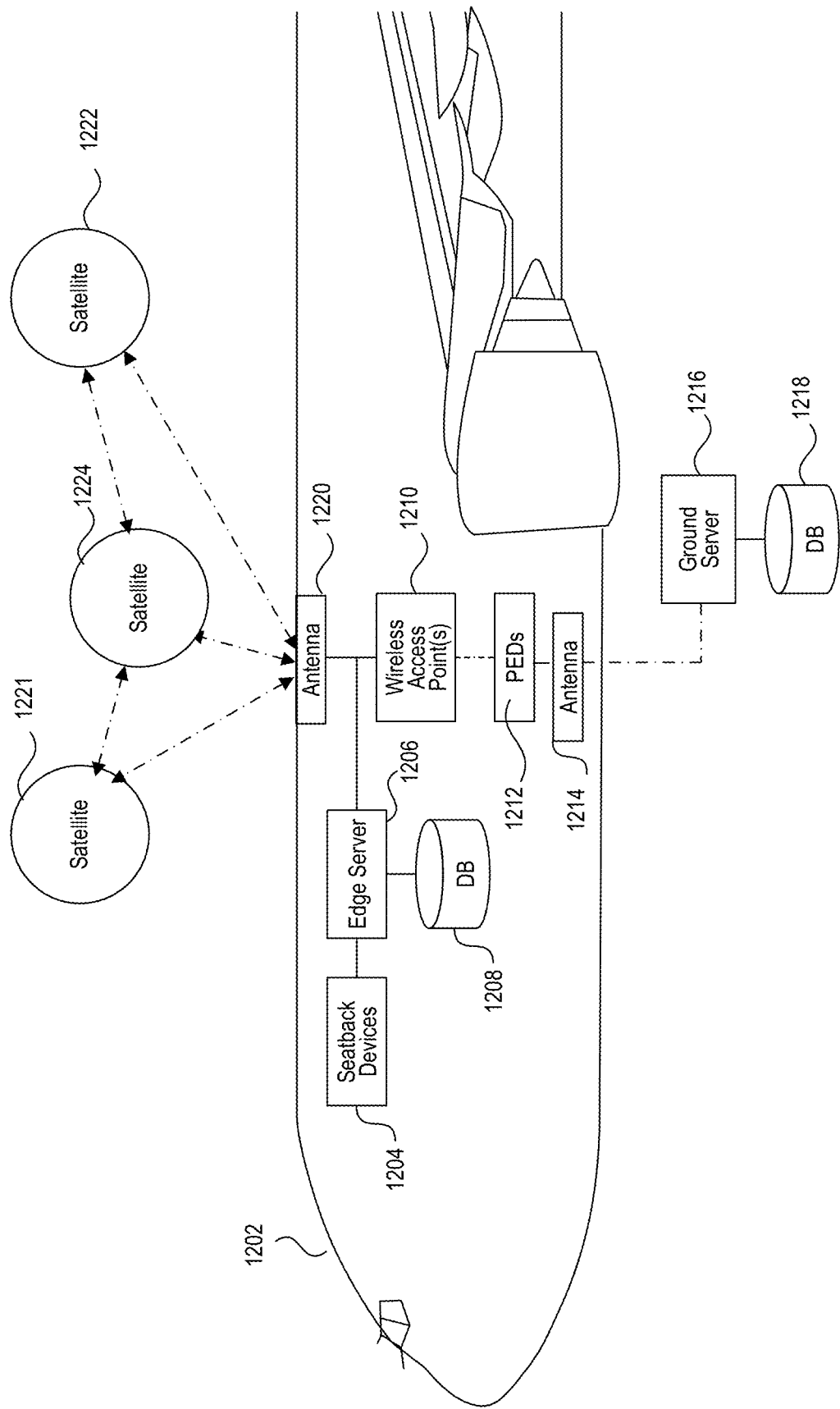
FIG. 12 shows an example of an in-flight entertainment system based on some implementations of the disclosed technology.

FIG. 12 shows an example of an in-flight entertainment system based on some implementations of the disclosed technology. In FIG. 12, the edge server 1206 may be in communication with another server, e.g., a ground server 1216 located on the ground (e.g., in an airport) via an antenna 1214. As discussed in FIG. 2, the ground server 1216 can operate as the outage prediction server. The ground server 1216 and the edge server 1206 can communicate to exchange data and information to assist the in-flight entertainment system to the seatback devices 1204 and PEDs 1212. For example, the edge server 1216 can obtain from the ground server 126 information about possible outage occurrence so that the edge server 1216 can, based on such information, provide information on a possible outage occurrence to passengers. In some implementations, the edge server 1216 can obtain such information about possible outage occurrences before a flight and store the information in a database 1208. The edge server 1216 may be configured to give an early notice of possible service interruptions to passengers based on the information about possible outage occurrences. In some implementations, such early notice can be made through a public announcement by a caption crew to every passengers. For the public announcement, the in-flight entertainment system prepares the audio and/or video contents corresponding to the possible service interruptions and distribute the audio and/or video to passengers through the seatback devices and/or PEDs. In some implementations, the edge server 1216 may be configured to use the information about possible outage occurrences to adjust service fees that are paid from customers based on service interruptions caused due to outage occurrences. Such early notification on possible outage occurrences can allow passengers on long flights to plan their internet usage and select an appropriate price package. The database 1218 may be coupled to the ground server 1216 and store data, e.g., processed network/operation data as shown in FIG. 2. The edge server 1206 can be in communication with a ground server 1216 through satellites 1221, 1222, and 1224 (for example, when at high altitude, flying over a body of water, or area where there is limited signaling from the ground) via an antenna 1220.

FIG. 13 shows a flowchart of an example method of a method for predicting an outage for a commercial passenger vehicle. At 1310, travel information of an upcoming travel of the commercial passenger vehicle is received. The commercial passenger vehicle is configured to provide a network connectivity for devices in the commercial passenger vehicle. In some implementations, the travel information may be received from sensors that are located on at least one of the commercial passenger vehicle, a ground terminal, or a network station. In some implementations, the travel information may include at least one of: a type of the commercial passenger vehicle, a position and an angle of the commercial passenger vehicle during the upcoming travel, a route of the commercial passenger vehicle, a direction of the travel, an antenna position, destination information, or terrain information during the travel. At 1302, a prediction of an outage of the network connectivity is performed based on the travel information. The prediction may be performed by determining probabilities of any of a weather-related outage caused due to a weather condition during the upcoming travel, a polar outage caused near a polar area, or a tail-blockage caused of a certain position of a tail of the commercial passenger vehicle relative to a satellite.

FIG. 16 shows a flowchart of an example method 1600 of a method for predicting an outage for a commercial passenger vehicle. The method 1600 includes, at operation 1610, receiving flight information of the commercial passenger vehicle that is configured to provide a network connectivity for devices in the commercial passenger vehicle through an antenna located in the commercial passenger vehicle, the flight information including travel information of the commercial passenger vehicle and antenna-related information of the antenna. The method 1600 further includes, at operation 1620, performing, based on the flight information, a prediction of an outage of the network connectivity by determining probabilities of an antenna-related outage caused due to a failure of the antenna.

Some embodiments may be described using the following clause-based format. The first set of clauses show example embodiments of techniques (e.g., tail blockage prediction, polar satellite outage prediction, and weather-related outage prediction).

1. A system for predicting an outage for a commercial passenger vehicle, comprising: a storage configured to store travel information of an upcoming travel by the commercial passenger vehicle that is configured to provide a network connectivity for devices in the commercial passenger vehicle to remote devices; and a server configured to process the travel information and generate an output indicative of a probability of an outage of the network connectivity based on the travel information of the upcoming travel, and wherein the server is further configured to apply a machine learning algorithm that (1) processes the travel information based on history information related to a planned route to be taken during the upcoming travel and regulation information related to the upcoming travel and (2) determines the probability of the outage along the planned route.

2. The system of clause 1, wherein the server includes an engine configured to perform the machine learning algorithm.

3. The system of clause 1, wherein the server is coupled to an external engine configured to perform the machine learning analysis and located outside of the server.

4. The system of clause 1, wherein the machine learning algorithm is further configured to provide a suggestion to modify a planned usage of a communication resource including at least one of an antenna, a satellite, or a ground station communicating with the satellite or the planned route based on the probability of the outage.

5. The system of clause 1, wherein the machine learning analysis is applied to determine the probability of the outage of the network connectivity based on a predefined condition that is related to an altitude, an elevation, or a latitude of the commercial passenger vehicle in the planned route.

6. The system of clause 1, wherein the travel information includes at least one of: a type of the commercial passenger vehicle, a position and an angle of the commercial passenger vehicle during the upcoming travel, a route of the commercial passenger vehicle, a direction of the travel, an antenna position, destination information, or terrain information during the travel.

7. The system of clause 1, wherein the server is further configured to receive weather information related to the upcoming travel and the probability of the outage is determined further based on the weather information.

8. The system of clause 1, wherein the server is further configured to transmit the output to the commercial passenger vehicle.

9. The system of clause 1, wherein the server is configured to generate the output by visualizing a portion of the planned route that is predicted to have the outage using a map.

10. A method for predicting an outage for a commercial passenger vehicle, comprising: receiving travel information of an upcoming travel of the commercial passenger vehicle that is configured to provide a network connectivity for devices in the commercial passenger vehicle; and performing, based on the travel information, a prediction of an outage of the network connectivity by determining probabilities of any of a weather-related outage caused due to a weather condition during the upcoming travel, a polar outage caused near a polar area, or a tail-blockage caused of a certain position of a tail of the commercial passenger vehicle relative to a satellite.

11. The method of clause 10, wherein the performing the prediction includes applying a machine learning algorithm that (1) processes the travel information based on history information related to a planned route to be taken during the upcoming travel and regulation information related to the upcoming travel and (2) determines the probability of the outage along the planned route.

12. The method of clause 10, further comprising: transmitting a result of the prediction to the commercial passenger vehicle.

13. The method of clause 10, further comprising: providing a suggestion to modify a planned usage of a communication resource including at least one of an antenna, a satellite, or a ground station communicating with the satellite based on a result of the prediction.

14. The method of clause 10, wherein the travel information is received from sensors that are located on at least one of the commercial passenger vehicle, a ground terminal, or a network station.

15. The method of clause 10, wherein the travel information includes at least one of: a type of the commercial passenger vehicle, a position and an angle of the commercial passenger vehicle during the upcoming travel, a route of the commercial passenger vehicle, a direction of the travel, an antenna position, destination information, or terrain information during the travel.

16. The method of clause 10, further comprising: receiving weather information related to the upcoming travel to determine the probabilities of the weather-related outage.

17. The method of clause 11, wherein the machine learning analysis is applied to determine the probability of the polar outage and the tail-blockage based on a predefined condition that is related to an altitude, an elevation, or a latitude of the commercial passenger vehicle in the planned route to be taken during the upcoming travel.

18. An apparatus for providing an outage prediction for a passenger on a commercial passenger vehicle, the apparatus located in the commercial passenger vehicle and comprising: an onboard server in communication with a ground server and configured to (1) receive, from the ground server, outage prediction information about a probability of an outage that is predicted to occur along a route of a travel and affects a network connectivity for devices in the commercial passenger vehicle to remote devices outside of the commercial passenger vehicle and (2) provide the outage prediction information to the passenger in the commercial passenger vehicle; and a personal electronic device in communication with the onboard server and configured to receive the outage prediction information from the onboard server.

19. The apparatus of clause 18, wherein the onboard server is further configured to provide an announcement of the outage prediction information during the travel to a passenger in the commercial passenger vehicle.

20. The apparatus of clause 18, wherein the onboard server is further configured to adjust service fees that are charged for services requiring the network connectivity based on the outage prediction information.

The second set of clauses show example embodiments of techniques (e.g., antenna related outage prediction.

1. A system for predicting an outage for a commercial passenger vehicle, comprising: a storage configured to store flight information of the commercial passenger vehicle that includes an antenna configured to assist a network connectivity for devices in the commercial passenger vehicle to remote devices, the flight information including travel information of the commercial passenger vehicle and antenna-related information of the antenna; and a server configured to apply a machine learning algorithm that (1) processes the flight information and (2) generate an output indicative of a probability of an antenna-related outage of the network connectivity that is caused due to a failure of the antenna based on processed flight information.

2. The system of clause 1, wherein the server includes a computing engine configured to perform the machine learning algorithm.

3. The system of clause 1, wherein the server is coupled to an external engine configured to perform the machine learning analysis and located outside of the server.

4. The system of clause 1, wherein the server is further configured to use fault trap data to determine the probability of the antenna-related outage.

5. The system of clause 1, wherein the server is further configured to determine the probability of the antenna-related outage based on predetermined rules regarding trap importance applied to the fault trap data.

6. The system of clause 1, further comprising a visualization module that provides a graphical representation of the probability of the antenna-related outage using numbers or colors that represent a level of a necessity of a maintenance or a replacement of the antenna.

7. The system of clause 1, wherein the antenna is located at a tail or a fuselage of the commercial passenger vehicle.

8. The system of clause 1, wherein the travel information includes at least one of: flight identification data of the commercial passenger vehicle and departure and arrival time of flights of the commercial passenger vehicle.

9. The system of clause 1, wherein the server is further configured to transmit the output to the commercial passenger vehicle.

10. The system of clause 1, wherein the server is in communication with an on-board server in the commercial passenger vehicle.

11. The system of clause 1, wherein the sever is further configured to provide a notification for a maintenance or a replacement of the antenna based on the output.

12. A method for predicting an outage for a commercial passenger vehicle, comprising: receiving flight information of the commercial passenger vehicle that is configured to provide a network connectivity for devices in the commercial passenger vehicle through an antenna located in the commercial passenger vehicle, the flight information including travel information of the commercial passenger vehicle and antenna-related information of the antenna; and performing, based on the flight information, a prediction of an outage of the network connectivity by determining probabilities of an antenna-related outage caused due to a failure of the antenna.

13. The method of clause 12, wherein the performing of the prediction includes applying a machine learning algorithm that (1) processes the flight information and (2) determines the probability of the antenna-related outage based on processed flight information.

14. The method of clause 12, further comprising: transmitting a result of the prediction to the commercial passenger vehicle.

15. The method of clause 12, further comprising: providing a graphical representation of the probability of the antenna-related outage using numbers or colors that represent a level of a necessity of a maintenance or replacement of the antenna.

16. The method of clause 12, wherein the performing of the prediction includes using fault trap data to determine the probabilities of the antenna-related outage.

17. The method of clause 16, wherein the performing of the prediction further includes applying predetermined rules regarding trap importance to the fault trap data to determine the probabilities of the antenna-related outage.

18. The method of clause 12, wherein the antenna is located at a tail or a fuselage of the commercial passenger vehicle.

19. The method of clause 12, wherein the travel information includes at least one of: flight identification data of the commercial passenger vehicle and departure and arrival time of flights of the commercial passenger vehicle.

20. The method of clause 12, further comprising providing a notification for a maintenance or a replacement of the antenna based on the output.

This patent document describes the exemplary vehicle entertainment systems in the context of a commercial passenger vehicle such as an airplane for ease of description. The exemplary vehicle entertainment systems could be employed in other types of commercial passenger vehicle such as a train, a ship, or a bus. Depending on the type of a commercial passenger vehicle, available types of outages to be predicted can be different. The network outage prediction system can operate to predict outages available to the commercial passenger vehicle based on the type of the commercial passenger vehicle.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A system for predicting an outage for a commercial passenger vehicle, comprising:
   a storage configured to store flight information of the commercial passenger vehicle that includes an antenna configured to assist a network connectivity for devices in the commercial passenger vehicle to remote devices, the flight information including travel information of the commercial passenger vehicle and antenna-related information of the antenna; and
   a server configured to apply a machine learning algorithm that (1) processes the flight information and (2) generate an output indicative of a probability of an antenna-related outage of the network connectivity that is caused due to a failure of the antenna based on processed flight information.

2. The system of claim 1, wherein the server includes a computing engine configured to perform the machine learning algorithm.

3. The system of claim 1, wherein the server is coupled to an external engine configured to perform the machine learning analysis and located outside of the server.

4. The system of claim 1, wherein the server is further configured to use fault trap data to determine the probability of the antenna-related outage.

5. The system of claim 1, wherein the server is further configured to determine the probability of the antenna-related outage based on predetermined rules regarding trap importance applied to the fault trap data.

6. The system of claim 1, further comprising a visualization module that provides a graphical representation of the probability of the antenna-related outage using numbers or colors that represent a level of a necessity of a maintenance or a replacement of the antenna.

7. The system of claim 1, wherein the antenna is located at a tail or a fuselage of the commercial passenger vehicle.

8. The system of claim 1, wherein the travel information includes at least one of: flight identification data of the commercial passenger vehicle and departure and arrival time of flights of the commercial passenger vehicle.

9. The system of claim 1, wherein the server is further configured to transmit the output to the commercial passenger vehicle.

10. The system of claim 1, wherein the server is in communication with an on-board server in the commercial passenger vehicle.

11. The system of claim 1, wherein the sever is further configured to provide a notification for a maintenance or a replacement of the antenna based on the output.

12. A method for predicting an outage for a commercial passenger vehicle, comprising:
   receiving flight information of the commercial passenger vehicle that is configured to provide a network connectivity for devices in the commercial passenger vehicle through an antenna located in the commercial passenger vehicle, the flight information including travel information of the commercial passenger vehicle and antenna-related information of the antenna; and
   performing, based on the flight information, a prediction of an outage of the network connectivity by determining probabilities of an antenna-related outage caused due to a failure of the antenna.

13. The method of claim 12, wherein the performing of the prediction includes applying a machine learning algorithm that (1) processes the flight information and (2) determines the probability of the antenna-related outage based on processed flight information.

14. The method of claim 12, further comprising:
   transmitting a result of the prediction to the commercial passenger vehicle.

15. The method of claim 12, further comprising:
   providing a graphical representation of the probability of the antenna-related outage using numbers or colors that represent a level of a necessity of a maintenance or replacement of the antenna.

16. The method of claim 12, wherein the performing of the prediction includes using fault trap data to determine the probabilities of the antenna-related outage.

17. The method of claim 16, wherein the performing of the prediction further includes applying predetermined rules regarding trap importance to the fault trap data to determine the probabilities of the antenna-related outage.

18. The method of claim 12, wherein the antenna is located at a tail or a fuselage of the commercial passenger vehicle.

19. The method of claim 12, wherein the travel information includes at least one of: flight identification data of the commercial passenger vehicle and departure and arrival time of flights of the commercial passenger vehicle.

20. The method of claim 12, further comprising providing a notification for a maintenance or a replacement of the antenna based on the output.

* * * * *